United States Patent
Masuda et al.

(10) Patent No.: US 6,172,803 B1
(45) Date of Patent: Jan. 9, 2001

(54) OPTICAL AMPLIFIER AND TRANSMISSION SYSTEM USING THE SAME

(75) Inventors: Hiroji Masuda; Shingo Kawai; Kenichi Suzuki; Kazuo Aida, all of Tokyo (JP)

(73) Assignee: Nippon Telegraph and Telephone Corporation (JP)

( * ) Notice: Under 35 U.S.C. 154(b), the term of this patent shall be extended for 0 days.

(21) Appl. No.: 09/171,409

(22) PCT Filed: Feb. 18, 1998

(86) PCT No.: PCT/JP98/00666

§ 371 Date: Oct. 16, 1998

§ 102(e) Date: Oct. 16, 1998

(87) PCT Pub. No.: WO98/36479

PCT Pub. Date: Aug. 20, 1998

(30) Foreign Application Priority Data

Feb. 18, 1997 (JP) .................................... 9/034067
Sep. 3, 1997 (JP) .................................... 9/238672

(51) Int. Cl.[7] ...................................................... H01S 3/00
(52) U.S. Cl. ............................................ 359/341; 359/334
(58) Field of Search ..................................... 359/334, 341

(56) References Cited

U.S. PATENT DOCUMENTS

| | | |
|---|---|---|
| 5,128,800 | 7/1992 | Zirngibl . |
| 5,323,404 | * 6/1994 | Grubb ........................................ 372/6 |
| 5,430,572 | 7/1995 | DiGiovanni et al. . |
| 5,778,014 | * 7/1998 | Islam ........................................ 372/6 |
| 5,883,736 | * 3/1999 | Oshima et al. ....................... 359/341 |
| 5,887,093 | * 3/1999 | Hansen et al. .......................... 385/27 |
| 5,900,969 | * 5/1999 | Srivastava et al. ................... 359/341 |

FOREIGN PATENT DOCUMENTS

| | | |
|---|---|---|
| 647000 A1 | 4/1995 | (EP) . |
| 1-231030 | 9/1989 | (JP) . |
| 6-18945 | 1/1994 | (JP) . |
| 6-77561 | 3/1994 | (JP) . |
| 6-169122 | 6/1994 | (JP) . |
| 6-224505 | 8/1994 | (JP) . |
| 7-176817 | 7/1995 | (JP) . |
| 8-213676 | 8/1996 | (JP) . |
| 9-43647 | 2/1997 | (JP) . |
| 10-107352 | 4/1998 | (JP) . |

OTHER PUBLICATIONS

H. Masuda, et al., "Ultra–wideband Optical Amplification with 3dB Bandwidth of 65 nm using a gain–Equalized Two–stage Erbium–doped Fiber Amplifier and Raman Amplification," Electronics Letters, vol. 33, No. 9, pp. 753–754, Apr. 24th, 1997.

H. Masuda, et al., "Wideband, Gain–flattened, Erbium–doped Fiber Amplifiers with 3dB Bandwidths of >50 nm", Electronics Letters, vol. 33, No. 12, pp. 1070–1071, Jun. 5th, 1997.

(List continued on next page.)

Primary Examiner—Mark Hellner
(74) Attorney, Agent, or Firm—Pennie & Edmonds LLP

(57) ABSTRACT

An optical amplifier having a two-stage construction using an erbium doped fiber (EDF) as a gain medium. The erbium dopant concentration is 1000 ppm, and the unsaturated absorption coefficient of the signal beam at 1550 nm is 1 dB/m. The length of the EDF 14-8 is 10 m, and the length of the EDF 14-12 is 70 m. The excitation light sources 14-6 and 14-10 are semiconductor lasers of 1.53 μm, and the excitation light power is 100 mW. Multiplexers 14-7 and 14-11 are inductive multi-layer film filters, and the gain equalizer 14-4 is a Fourier filter. The peak loss of the Fourier filter is 17 dB. The gain of the EDF 14-8 is 25 dB, and the gain of the EDF 14-12 is 15 dB. Two optical isolators are installed on a pre-stage amplifier, and one on a post-stage amplifier in order to prevent laser oscillation.

32 Claims, 32 Drawing Sheets

OTHER PUBLICATIONS

H. Masuda, et al., "High Gain Two-stage Amplification with Erbium-doped Fiber Amplifier", Electronics Letters, vol. 26, No. 10, pp. 661–662, May 1st, 1990.

F. Massicott, et al., "High Gain, Broadband 1–6 $\mu$m $Er^{3+}$ Doped Silica Fiber Amplifier", Electronics Letters, vol. 26, No. 20, Sep. 27th, 1990.

J.F.Massicott, et al., "Low Noise operation of $Er^{3+}$ Doped Silica Fiber Amplifier around 1–6 $\mu$m", Electronics Letters, vol. 28, No. 20, Sep. $24^{th}$, 1992.

M Tachibana, et al., "Erbium-Doped Fiber Amplifier with Flattened Gain Spectrum", IEEE Photonics Technology Letters, vol. 3, No. 2, Feb. 1991.

B.Clesca, et al., "Gain Flatness Comparison between Erbium-Doped Fluoride and Silica Fiber Amplifiers with Wavelength-Multiplexed Signals", IEEE Photonics Technology Letters, vol. 6, No. 4, Apr. 1994.

P.B.Hansen, et al., "Capacity Upgrades of Transmission System by Raman Amplification", IEEE Photonics Technology Letters, vol. 9, No. 2, Feb. 1997.

H.Masuda, et al., "75-nm 3-dB Gain-ban Optical Amplification with Erbium-doped Fluoride Fiber Amplifiers and Distributed Raman Amplifiers in 9×2.5 Gb/s WDM Transmission Experiment", ECOC 97, Conference Publication No. 448, Sep. $25^{th}$,1997.

H.Masuda, et al., Ultra-wideband Optical Amplification with a 3-dB Bandwidth of 67 nm using a Partially Gain-Flattened Erbium-doped Fiber Amplifier and Raman Amplifier', Optical Amplifiers and their Applications, 40/MC3–1, Jul. $21^{th}$, 1997.

H.Masuda, et al., Ultra-wideband Optical Amplification using a Gain-flattened Erbium-doped Fiber Amplifier and Raman Amplifier, Proceedings of the 1997 Communications Society Conference of IEICE, B–10–179, Sep. 3rd, 1997.

* cited by examiner

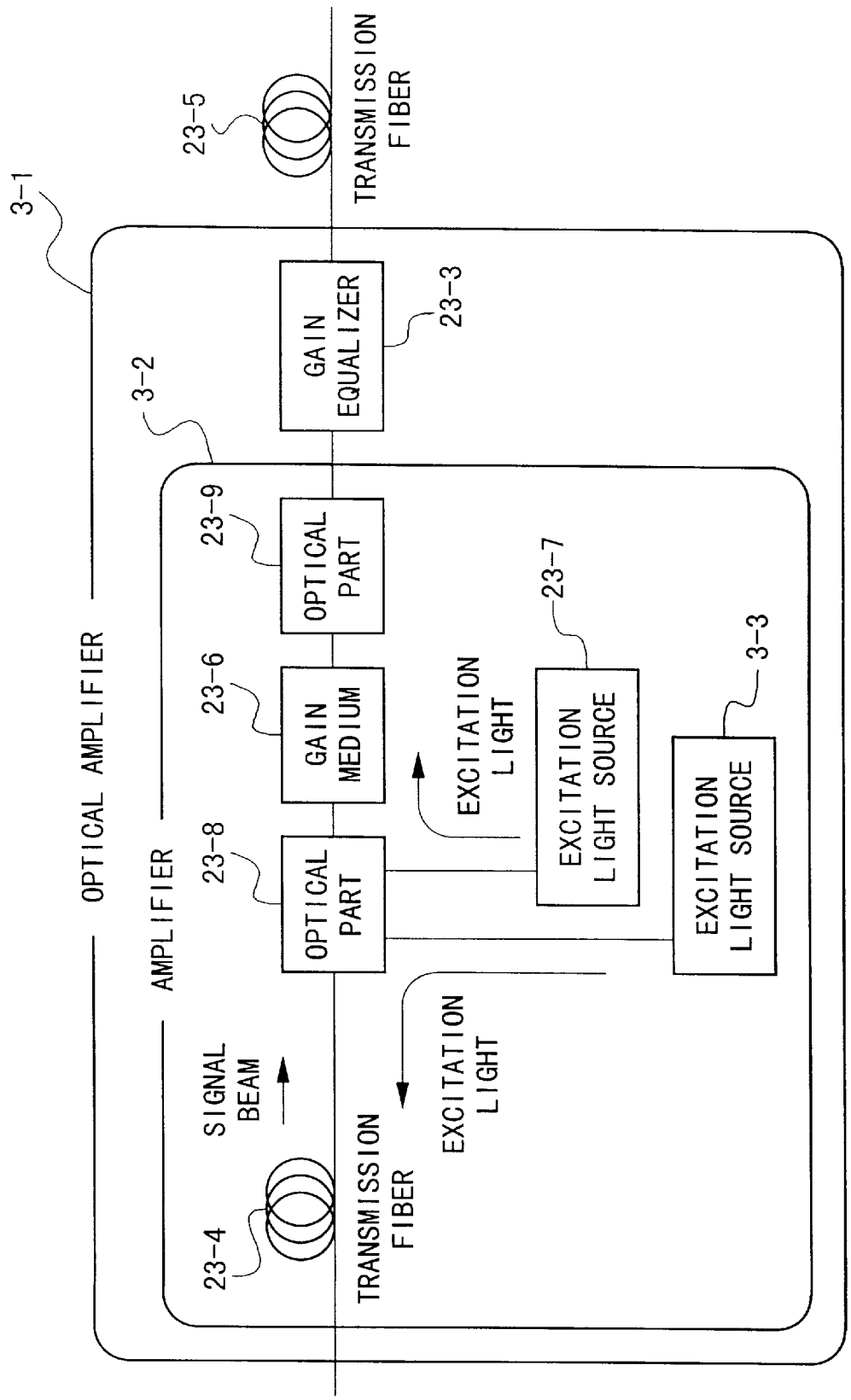

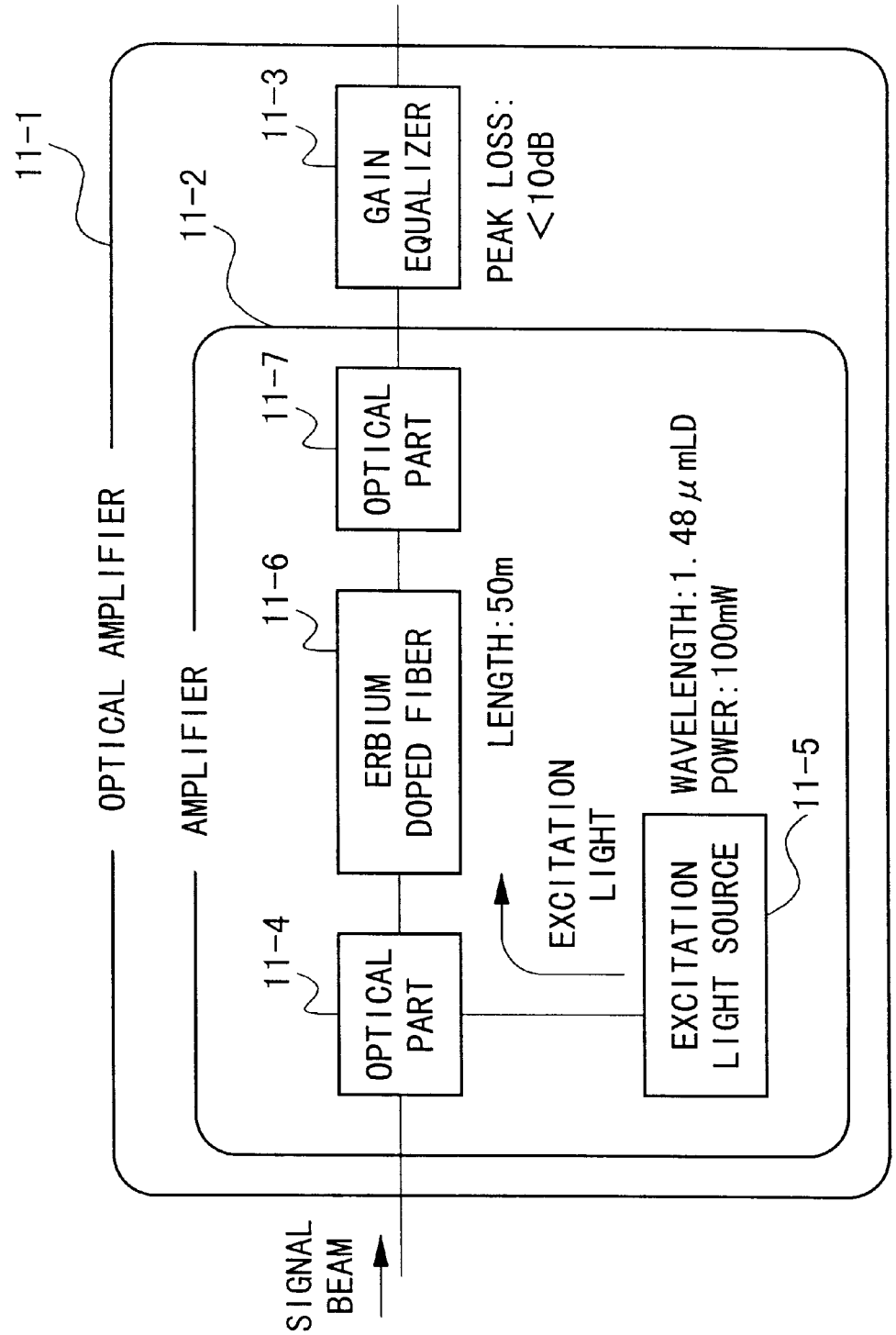

GAIN SPECTRUM

OPTICAL AMPLIFIER AND TRANSMISSION SYSTEM USING THE SAME

FIELD OF THE INVENTION

The present invention relates to an optical amplifier and a transmission system which uses it, which are necessary in an optical fiber transmission system and optical signal processing system.

DESCRIPTION OF RELATED ART

The structure of an optical amplifier of the related technology used in an optical fiber transmission system is shown in FIGS. 23~25. FIGS. 23, 24, and 25 show respectively the first, second, and third structures of the optical amplifiers of the related technology.

In FIG. 23, the optical amplifier 23-1 comprises an amplifier 23-2 and a gain equalizer 23-3. This optical amplifier 23-1 is connected to transmission fibers 23-4 and 23-5. Signal beams with a plurality of wavelengths are incident on this optical amplifier 23-1, and amplified. This amplifier 23-2 comprises a gain medium 23-6 (a rare-earth element doped fiber or waveguide), an excitation light source 23-7, and an optical part 23-8 (multiplexer for excitation light and signal beam, a light isolator, etc.) disposed on the pre-stage of a gain medium 23-6, and an optical part 23-9 (optical isolator, etc.) disposed on the post-stage of the gain medium 23-6 (see Citation Massicott et al., Electron. Lett., vol. 26, No. 20, pp. 1645–1646, 1990).

The gain characteristics of the optical amplifier 23-1 whose structure is shown in FIG. 23 are shown in FIGS. 26A~26C. FIG. 26A shows the wavelength dependency of the gain of the gain medium 23-6. In FIG. 26A, the peak value of the gain is 30 dB, the gain-flattened bandwidth (for example, the 3 dB gain-reduction bandwidth) is 10 nm. The loss of the gain equalizer 23-3 is shown in FIG. 26B. The peak value of this loss is about 10 dB. The value obtained by subtracting the loss of FIG. 26B from the gain of FIG. 26A is the gain of the optical amplifier 23-1, and this is shown in FIG. 26C. For simplification, the loss of the optical part 23-8 and the optical part 23-9 are ignored. By using the gain equalizer 23-3, the gain-flattened bandwidth is increased by about 30 nm. In this manner, as long as the signal beam wavelength intervals are equal, if the gain-flattened bandwidth is widened, it is an advantage that signal beams of more wavelengths (and therefore more channels) can be amplified with an identical gain.

FIG. 24 has the same gain characteristics as FIG. 23, but compared to FIG. 23, this structure of an optical amplifier has lower noise. The difference between this figure and FIG. 23 is that in this figure two excitation light sources 23-7 and 24-3 with different excitation light wavelengths are used. The wavelength of the excitation light which is output by excitation light source 24-3 is shorter than the wavelength of the excitation light output by excitation light source 23-7, and the upper part of the gain medium 23-6 (with respect to the input direction of the signal beam) is excited to a higher population inversion state in comparison to FIG. 23 (see Citation Massicott et al., Electron. Lett., vol. 28, No. 20, pp. 1924–1925, 1992).

FIG. 25 is an optical amplifier with a structure analogous to the structure of the present invention, although the widening of the bandwidth of the gain was not planned. The amplifier is divided into a pre-stage (amplifier 25-2) and a post-stage (amplifier 25-3), and a band restricting optical filter or a dispersion compensator is disposed therebetween. The signal beam is generally a single wavelength. When a band limiting optical filter is used, because the gain medium is divided into two stages, degradation of the amplification characteristics due to laser oscillation or amplified spontaneous emission light is not incurred, and a high gain is possible. When using a dispersion compensator, it is possible to eliminate degradation of the signal to noise ratio due to loss in the dispersion compensator (see Citation Masuda et al., Electron. Lett., vol. 26, No. 10, pp. 661–662, 1990).

In the structures shown in FIG. 23 and FIG. 24, flattened-gain dependence of the flat-gain bandwidth and equalizer loss dependency of the optical amplifier saturation power are shown respectively in FIG. 9A and FIG. 9B. In FIG. 9A, the flattened-gain bandwidth decreases along with the increase in the flattened-gain, and the flattened-gain is limited to 30 dB because of amplification characteristics degradation due to laser oscillation and amplified spontaneous emission light. In contrast, in FIG. 9B, the optical amplifier saturation output power remarkably decreases along with the increase in the equalizer loss. However, the drawback occurs that in obtaining a wide flattened-gain bandwidth, it is difficult to obtain a wide flattened-gain bandwidth while maintaining a large optical amplifier saturation output power because of a necessarily large equalizer loss.

The object of the present invention is to resolve these problems, and provide a wide bandwidth optical amplifier.

SUMMARY OF THE INVENTION

In order to obtain the above-described object, the present invention provides an optical amplifier provided with a split gain medium wherein a long gain medium using a rare-earth doped fiber as the gain medium is partitioned into two or more stages, two or more amplifiers which include excitation light sources which output excitation light such that the effective excitation wavelength of this gain medium is 1.53 $\mu$m, and a gain equalizer which is effective for a wide wavelength band of a gain medium disposed between each amplifier. In this manner, compared to the related technologies, the effect is obtained that the gain-flattened band is wide, and it is possible to realize a high saturation output, low noise optical amplifier.

In addition, the present invention provides a Raman amplifier provided with a high nonlinear fiber or a dispersion compensation fiber as a Raman amplifier medium, and carries out Raman amplification by this Raman amplifier medium, and a rare-earth element doped fiber amplifier which makes a rare-earth doped fiber the amplification medium. In this manner, the gain bandwidth is flattened and it is possible to structure a broadband lumped constant optical amplifier.

In addition, the present invention provides an optical transmission system with an optical amplifier as a structural component provided with a Raman amplifier which carries out Raman amplification by a dispersion-compensation fiber wherein a parameter which compensates the dispersion of the transmission path is set, and a rare-earth doped fiber amplifier which uses a rare-earth fiber as an amplifier medium. In this manner, when using a dispersion-compensation fiber as Raman amplifier medium, it is possible to realize large capacity wavelength division multiplex optical transmission because it is possible to compensate the dispersion of the transmission path.

BRIEF DESCRIPTION OF THE DRAWINGS

FIG. 3 is a block diagram of a third structure of this invention.

FIGS. 11A and 11B show graphs of the structure of a typical example of the related technology.

PREFERRED EMBODIMENTS OF THE PRESENT INVENTION

First, we will explain the summary of the first through sixth structures of the optical amplifier wherein a long length gain medium is partitioned into several stages, and a gain equalizer connects each partitioned gain medium, then we will explain the first through sixths embodiments.

Next, we will explain the seventh through thirteenth embodiments of an optical amplifier provided with a Raman amplifier wherein a high nonlinear fiber or a dispersion-compensation fiber is used as a Raman amplification medium.

Finally, we will show two embodiments of an optical transmission system wherein an optical amplifier, which Raman amplifies by a dispersion-compensation fiber, is used as a component element.

Summary

The first through sixths structures of the present invention are shown in FIGS. 1 to 6.

Figure 1:
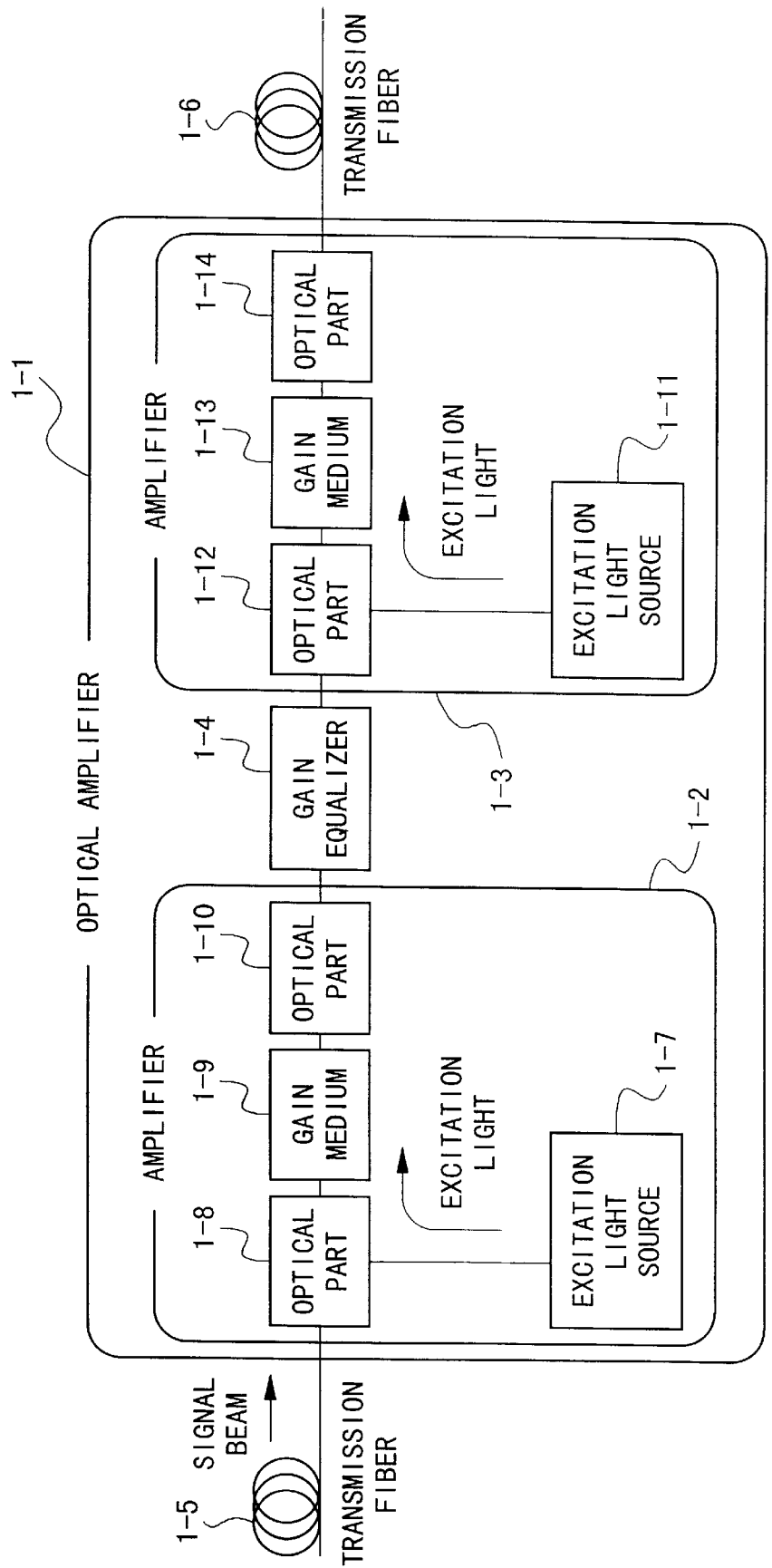
FIG. 1 is a block diagram showing a first structure of this invention (in the case of a two-stage gain medium).
Figure 23:
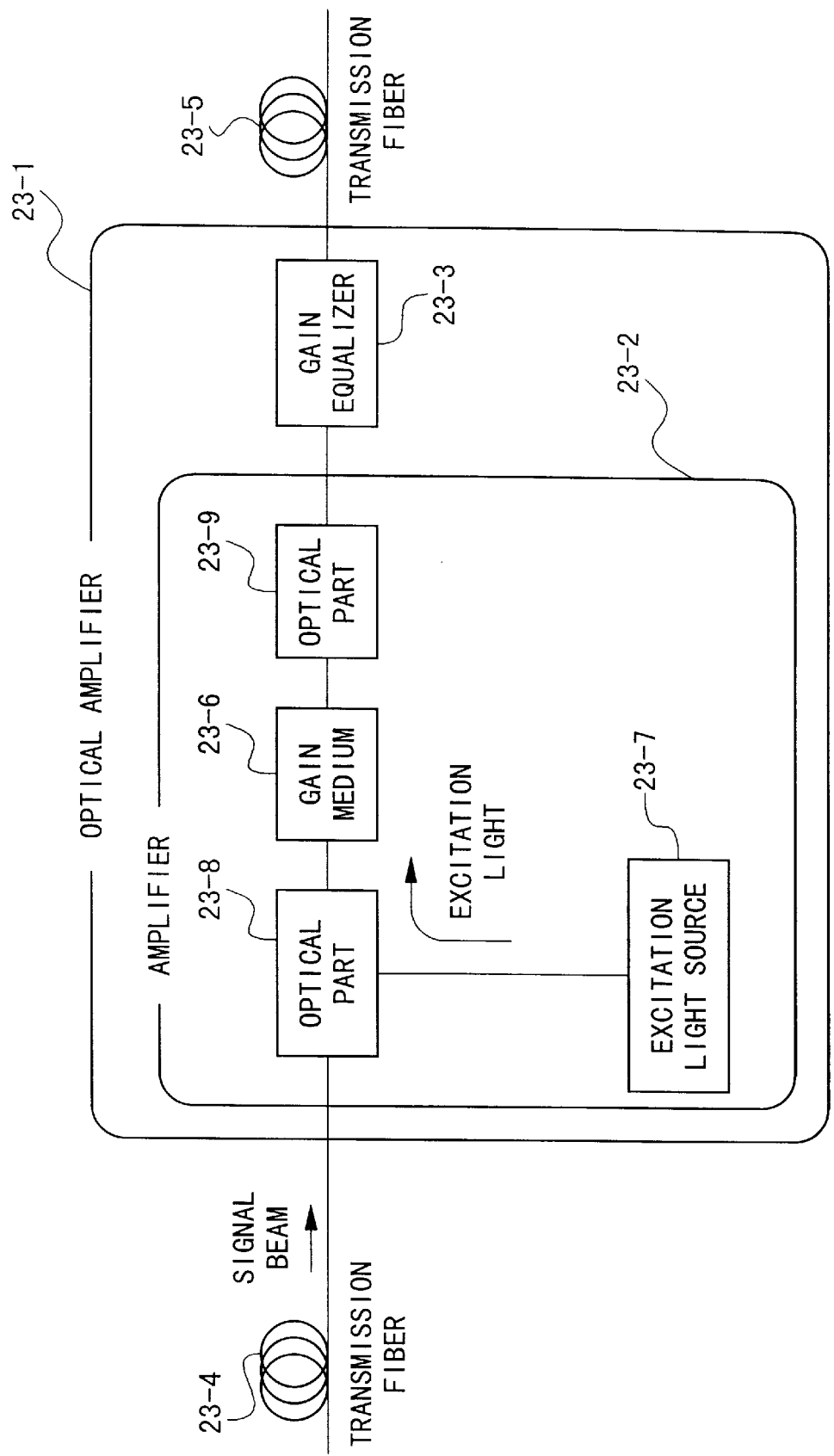
FIG. 23 is a block diagram showing an example of the first structure of the optical amplifier of the related technology.
Figure 24:
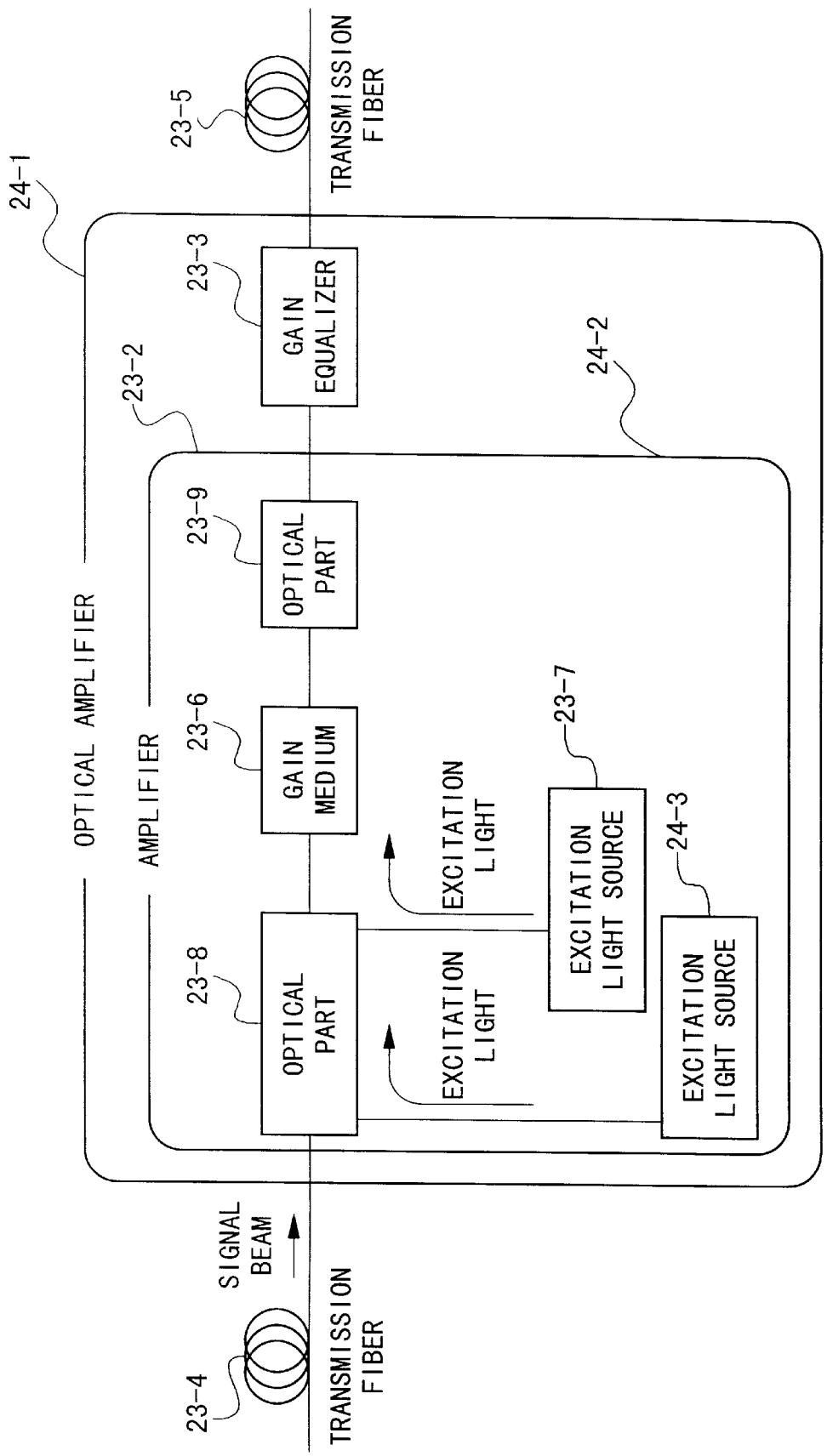
FIG. 24 is a block diagram showing an example of the second structure of the optical amplifier of the related technology.
Figure 25:
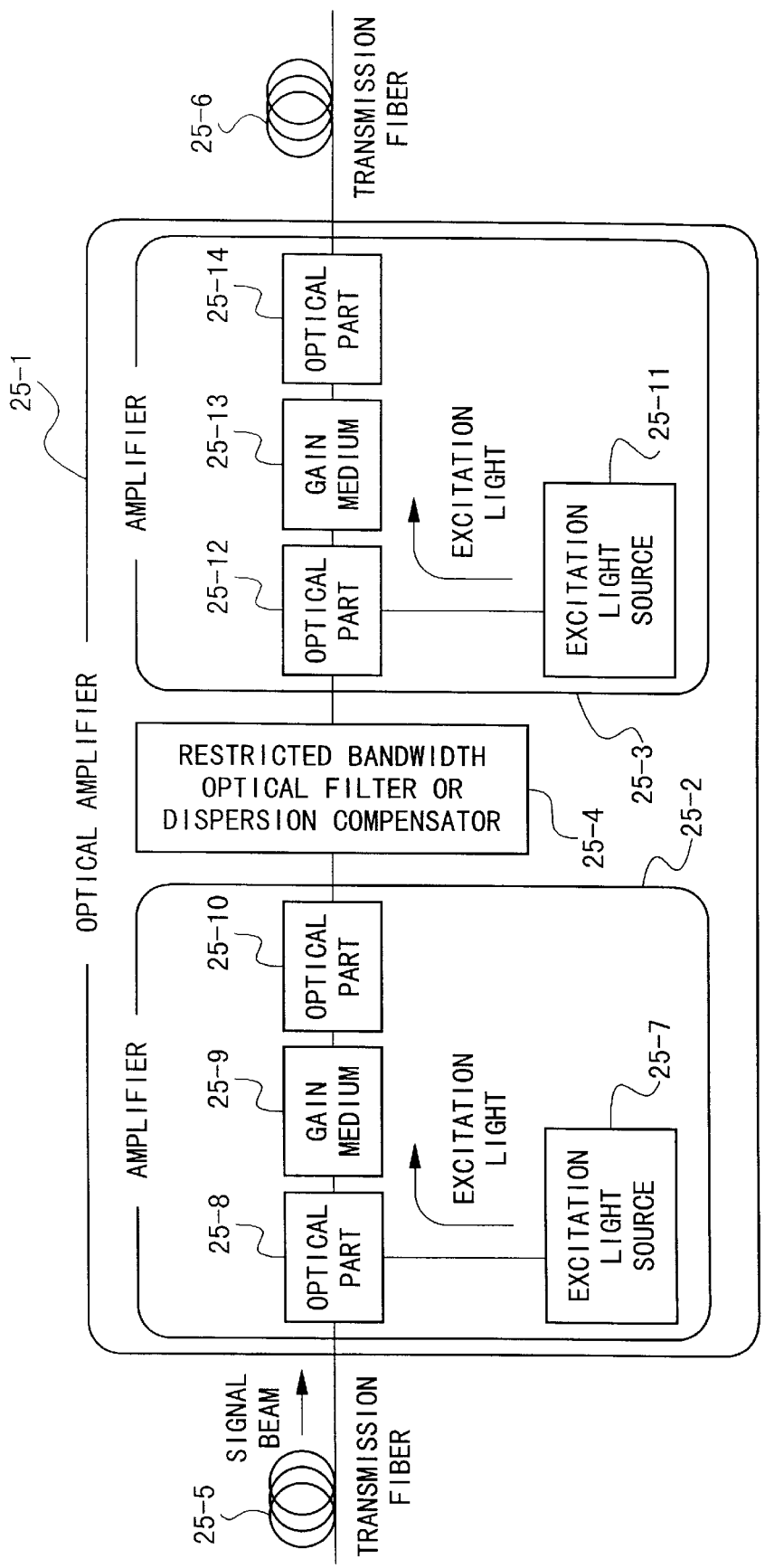
FIG. 25 is a block diagram showing an example of the third structure of the optical amplifier of the related technology.

FIG. 1, which is the first structure, differs markedly from FIG. 23 of the related technology in that the amplifier is divided into two stages: a pre-stage (amplifier 1-2) and a post-stage (amplifier 1-3). In addition, FIG. 1 differs markedly from FIG. 25 of the related technology in that the optical part disposed between the pre-stage of the amplifier 1-2 and the post-stage of the amplifier 1-3 is a gain equalizer 1-4, and that the input signal beam is a wide band multiple wavelength beam.

Figure 7A:
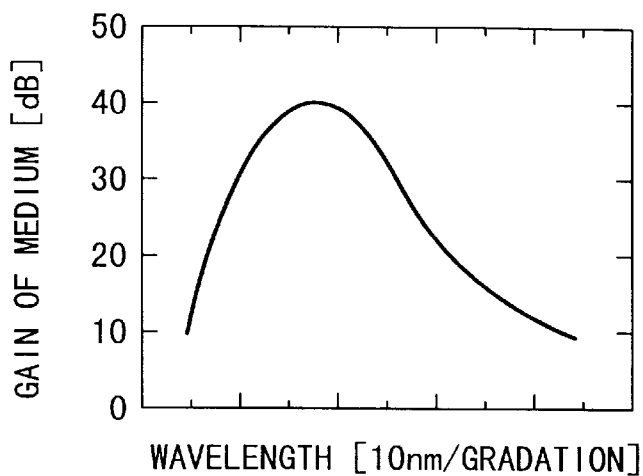
FIGS. 7A and 7B are graphs showing the characteristics of the first structure of this invention.
Figure 7B:
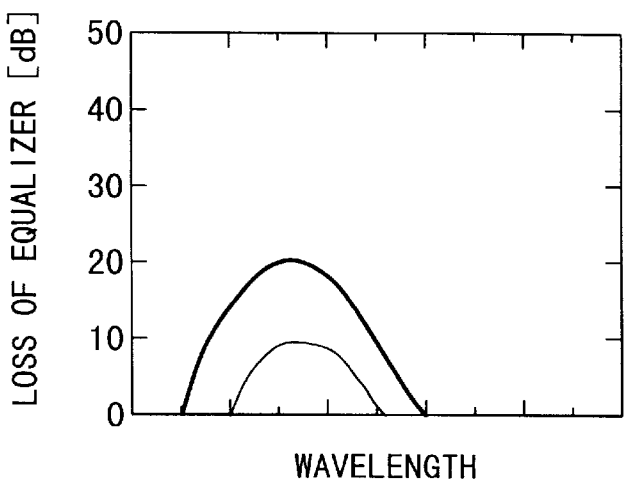

The gain characteristics of this first structure are shown in FIGS. 7A, 7B, and 7C. FIG. 7A shows the wavelength dependency of the gain of the gain medium. In FIG. 7A, the peak value of the gain is about 40 dB, and in comparison to the related technology, because there is no degradation of the amplifier characteristics due to laser oscillation and amplified spontaneous light emission, a high value can be obtained. The typical value of the gain of the pre-stage amplifier 1-2 is 25 dB, and the typical value of the gain of the post-stage amplifier 1-3 is 15 dB. In addition, the gain increases at or above a constant value (for example, 10 dB or 20 dB). FIG. 7B shows the loss of the equalizer 1-4. The peak value of this loss is about 10 dB and 20 dB.

Figure 8:
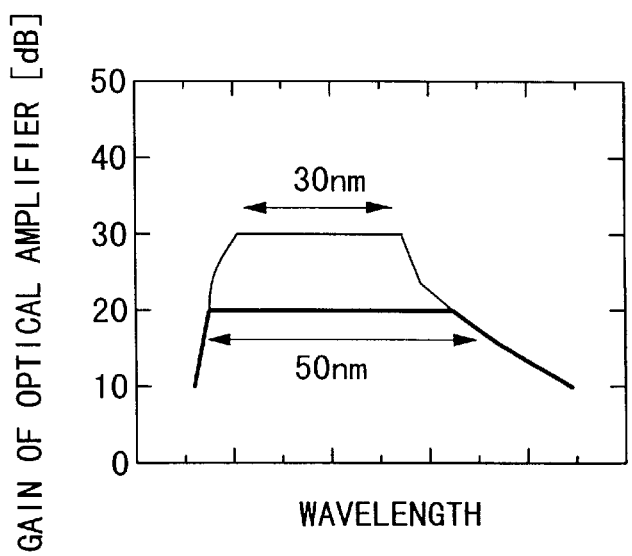
FIG. 8 is a graph showing characteristics of the first structure of this invention.
Figure 9A:
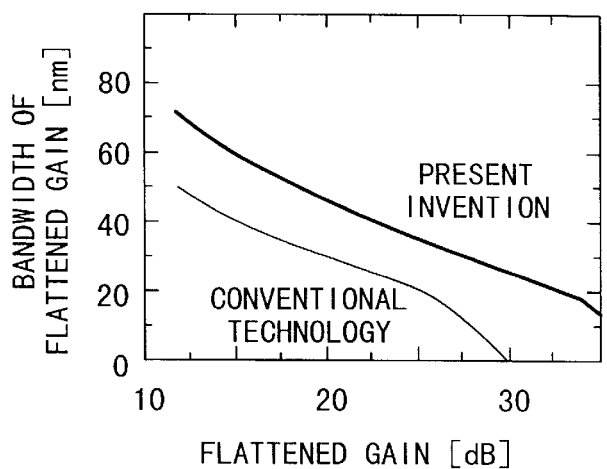
FIGS. 9A and 9B are graphs showing the characteristics of the first structure of this invention and the related technology.
Figure 9B:
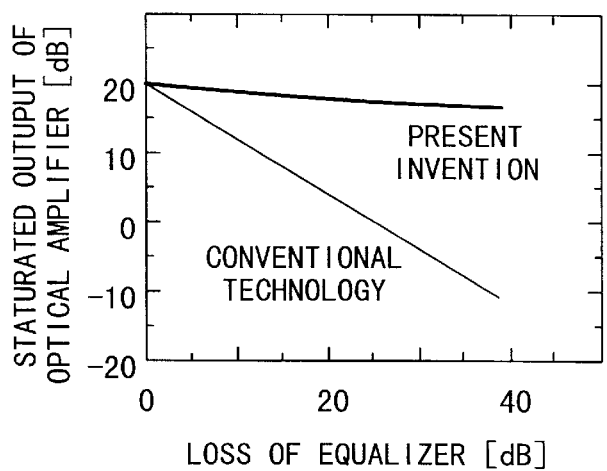
Figure 26A:
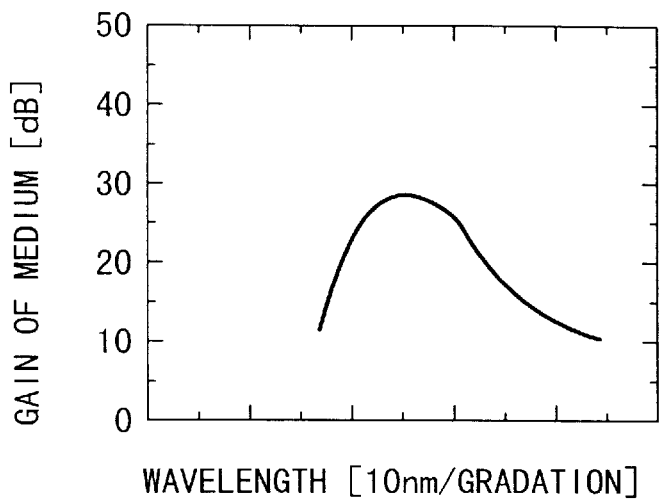
FIGS. 26 A~C are graphs showing the characteristics of the optical amplifier having the structure in FIG. 23.
Figure 26B:
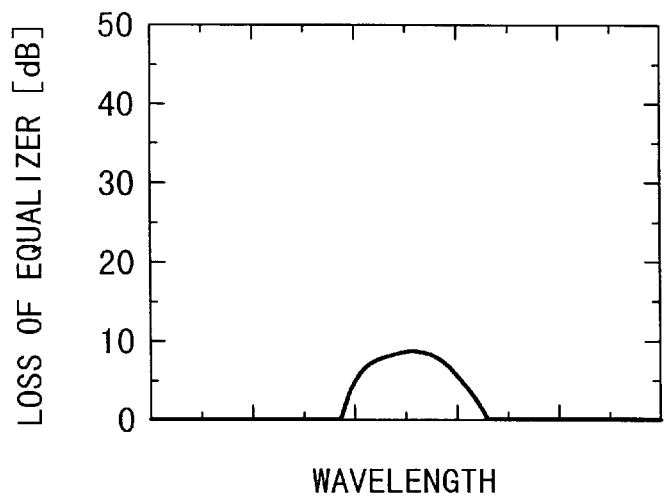
Figure 26C:
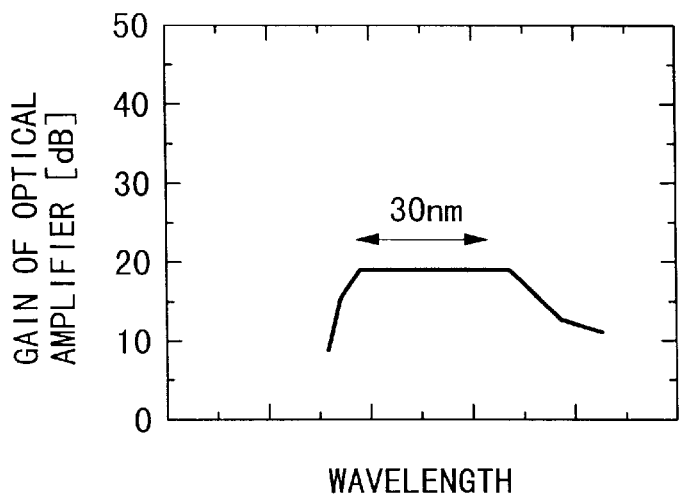

The value derived by subtracting the loss in FIG. 7B from the gain in FIG. 7A is the gain of optical amplifier 1-1, and this is shown in FIG. 8. For the sake of simplification, the loss of optical parts 1-8 and 1-10, and optical parts 1-12 and 1-14 has been ignored. The gain-flattened bandwidth with the 10 dB loss peak value is 30 nm, and the gain-flattened bandwidth with the 20 dB loss peak value is 50 nm. The gain-flattened bandwidth with a 20 dB flattened-gain value in the related technology is 30 nm as shown in FIG.26C, and the gain-flattened bandwidth with a 20 dB flattened-gain value in the present invention is 50 nm as shown in FIG.8. Due to the structure of the present invention, we can understand that the gain-flattened bandwidth has been remarkably widened The dependency of the flattened-gain bandwidth upon the flattened-gain in the present invention is shown in FIG. 9A. In comparison to the related technology, we understand that the gain-flattened bandwidth has been remarkably increased. FIG. 9B shows the dependency of the optical amplifier saturation output upon the equalizer loss in the present invention. In the present invention, because there is an optical amplifier (amplifier 1-3) following the gain equalizer 1-4, we understand that the saturated output of the optical amplifier does not depend very much on the equalizer loss. In comparison with the related technology, we understand that the saturated output of the optical amplifier has remarkably increased. As shown above, in the first structure of the present invention, it is possible to guarantee a wide gain-flattened bandwidth while maintaining the high optical amplifier saturation output as-is.

Figure 27:
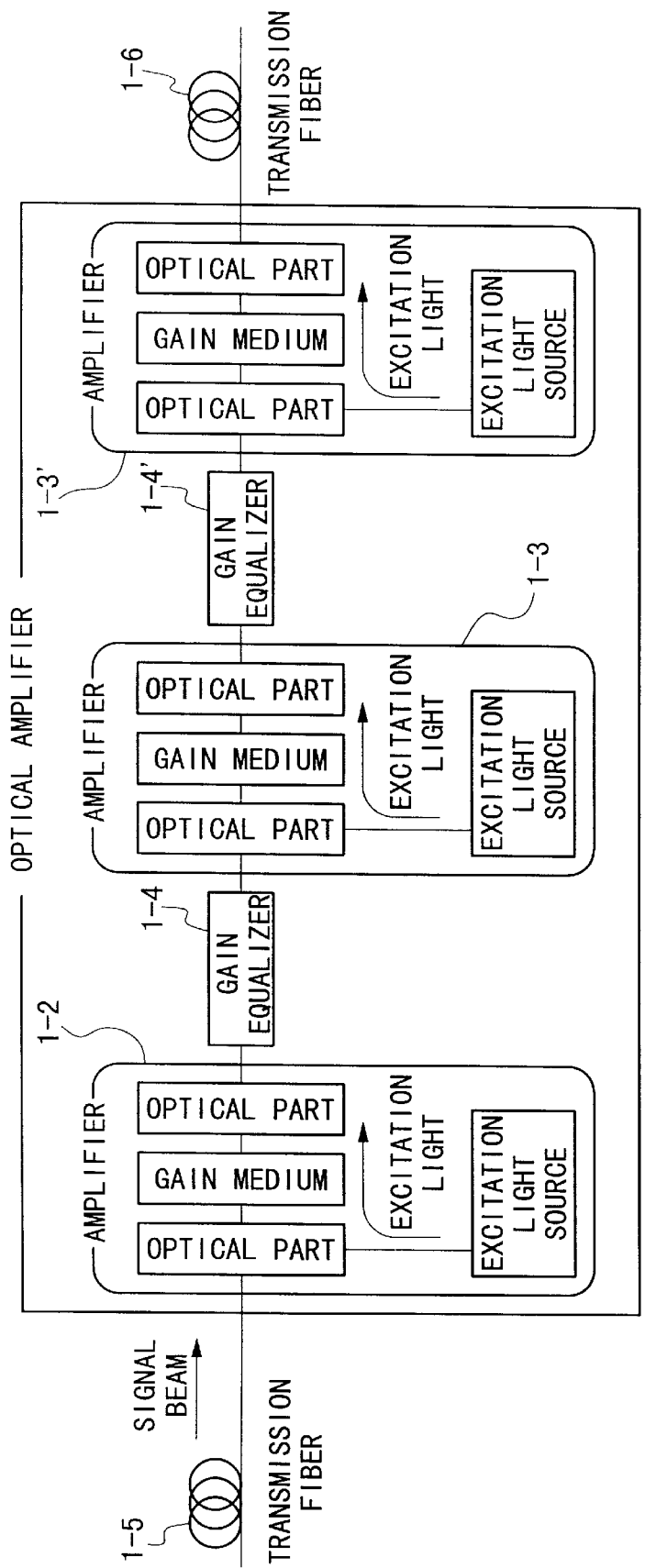
FIG. 27 is a block diagram showing a first structure of this invention (a three stage gain medium).

In addition, the structure of the case wherein the gain medium has been partitioned into three stages is shown in FIG. 27. The gain equalizers 1-4 and 1-4' have been disposed between the three-stage gain medium. Because two gain equalizers 1-4 and 1-4' are being used, the total peak value of the loss of the gain equalizer can be set at about 30 dB. The gain-flattened bandwidth at this time is 60 nm. Because the gain-flattened bandwidth is 50 nm when the gain medium is divided into two stages, it is possible to enlarge the gain-flattened bandwidth about 10 nm by partitioning into three stages. Moreover, in the figure, an example of a gain medium partitioned into three stages is shown, but it is possible to compose the optical amplifier in which the number of partitions is N (N is an integer equal to or greater than 2), and an N stage amplifier wherein a partitioned gain-medium is used as a structural component, and N−1 stage gain equalizer is disposed between these amplifiers. Moreover, by increasing the number of partitions N, it is possible to gradually increase the gain-flattened bandwidth of the optical amplifier within the bandwidth range of the gain medium.

Figure 2:
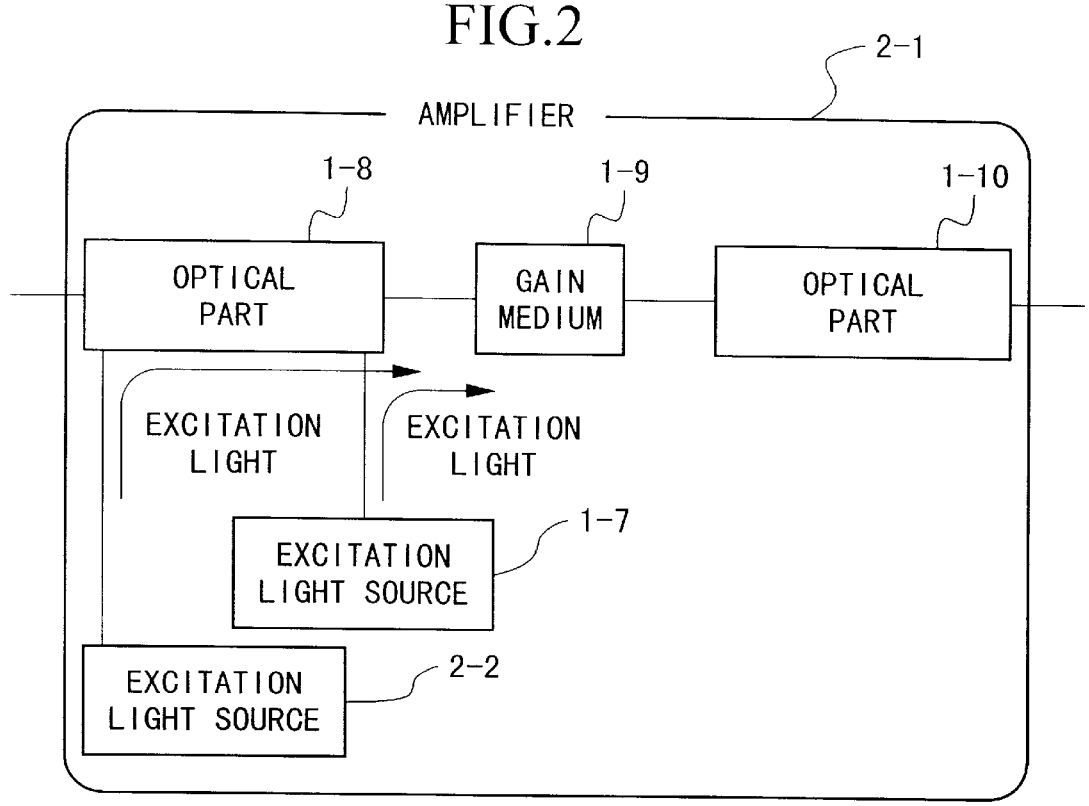
FIG. 2 is a block diagram of a second structure of this invention.

FIG. 2 shows the second structure of the present invention. In the second structure of the present invention, the amplifiers 1-2 and 1-3 having the structure (first structure) shown in FIG. 1 are respectively replaced with amplifiers having the structure shown in FIG. 2. Compared to FIG. 1, the amplifier farther comprises one more excitation light source. In FIG. 2, for the sake of simplifying the figure, only the points of difference with FIG. 1 are shown for the amplifier 2-1 which corresponds to the amplifier 1-2 in FIG. 1. This point of difference is similar for the amplifier (not shown) corresponding to the amplifier 1-3 in FIG. 1. In comparison with FIG. 1, the present construction is a structure of a lower noise optical amplifier. The difference between FIG. 2 and FIG. 1 is that two excitation source lights 1-7 and 2-2 with different optical excitation wavelengths are used. The wavelength of the excitation light emitted from excitation light source 2-2 is shorter than the wavelength of the excitation light emitted from excitation light source 1-7, and in comparison with FIG. 1, the upper part of the gain medium 1-9 (with respect to the direction of input of the signal beam) is excited to a higher population inversion state.

Figure 10:
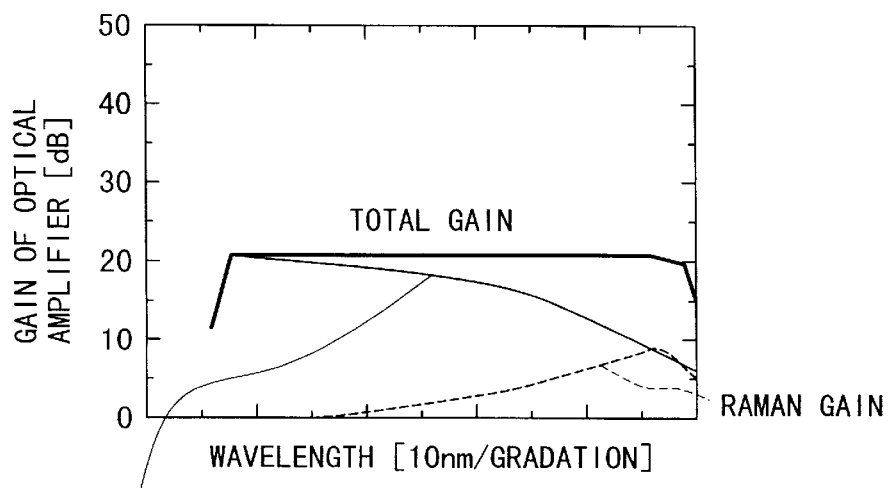
FIG. 10 is a graph of the characteristics of the third structure of this invention.

FIG. 3 shows the third structure of the present invention. The difference between this figure and FIG. 23 (related technology) is that a transmission fiber 23-4 is used as an amplifier medium, and its excitation light source 3-3 is newly installed. The transmission fiber 23-4 carries out Raman amplification, and its gain has the characteristic of flattening the wavelength dependency of the gain medium such as a rare-earth doped fiber, etc., that is, equalizing the gain depending on wavelength. That is, the wavelength of the excitation light is set in the short-wave part only of the Raman shift amount (about 110 nm for silica fibers) of the wavelength which produces gain equalization. The gain characteristics of this third structure are shown in FIG. 10. The gain-flattened bandwidth of the total gain (gain medium gain−equalizer loss+Raman gain) is wider than the gain-flattened bandwidth of the gain (gain medium gain−equalizer loss) when Raman amplification is carried out.

Figure 4:
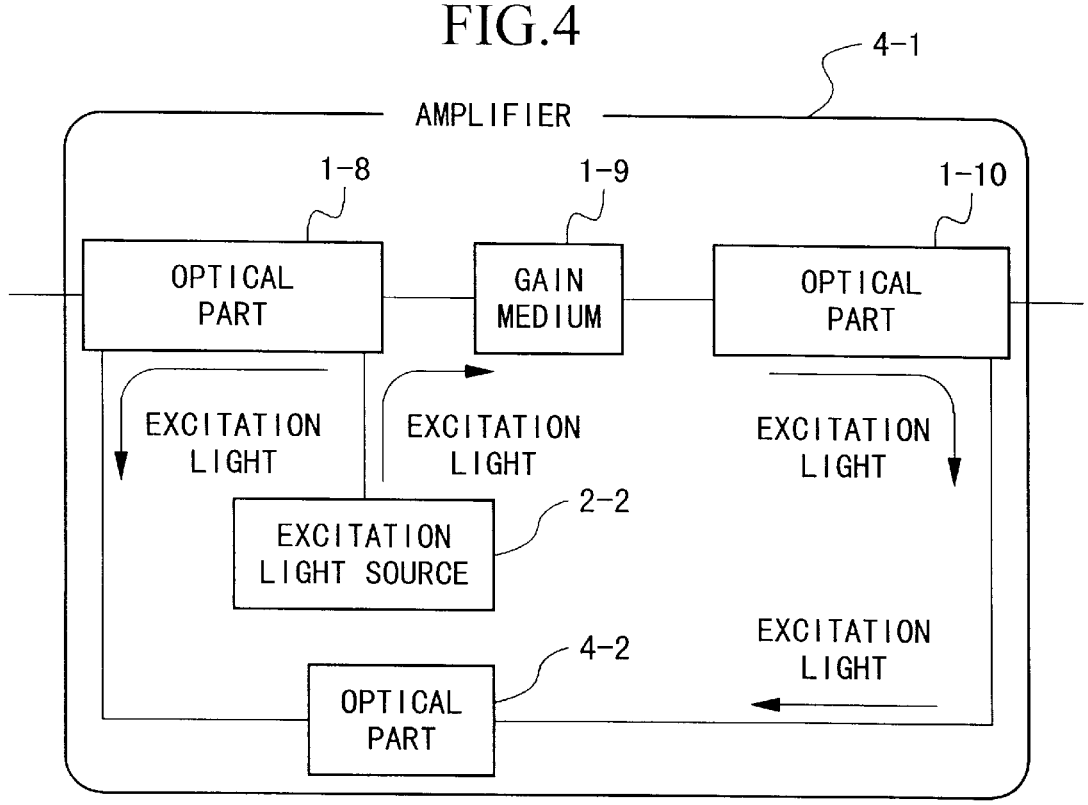
FIG. 4 is a block diagram of a fourth structure of this invention.

FIG. 4 shows the fourth structure of the present invention. The gain and noise characteristics are similar to those of FIG. 2 (the second structure of the present invention), but the component parts are simpler, cheaper, and the construction becomes more stable. In order to guarantee low noise characteristics, a excitation light source 2-2 with a short excitation wavelength is used. Using optical part 4-2, a laser ring (optical part 1-8~gain medium 1-9~optical part 1-10~optical part 4-2~optical part 1-8) using gain medium 1-9 as a laser oscillation medium is formed. At this time, the optical part 1-8 and the optical part 1-10 have a multiplexer and demultiplexer respectively for laser oscillation. This laser oscillation light has an operation similar to the excitation light which the excitation light source 1-7 outputs in FIG. 2 (the second structure of the present invention), that is, an operation wherein the gain medium is excited to the desired population inversion state.

Figure 5:
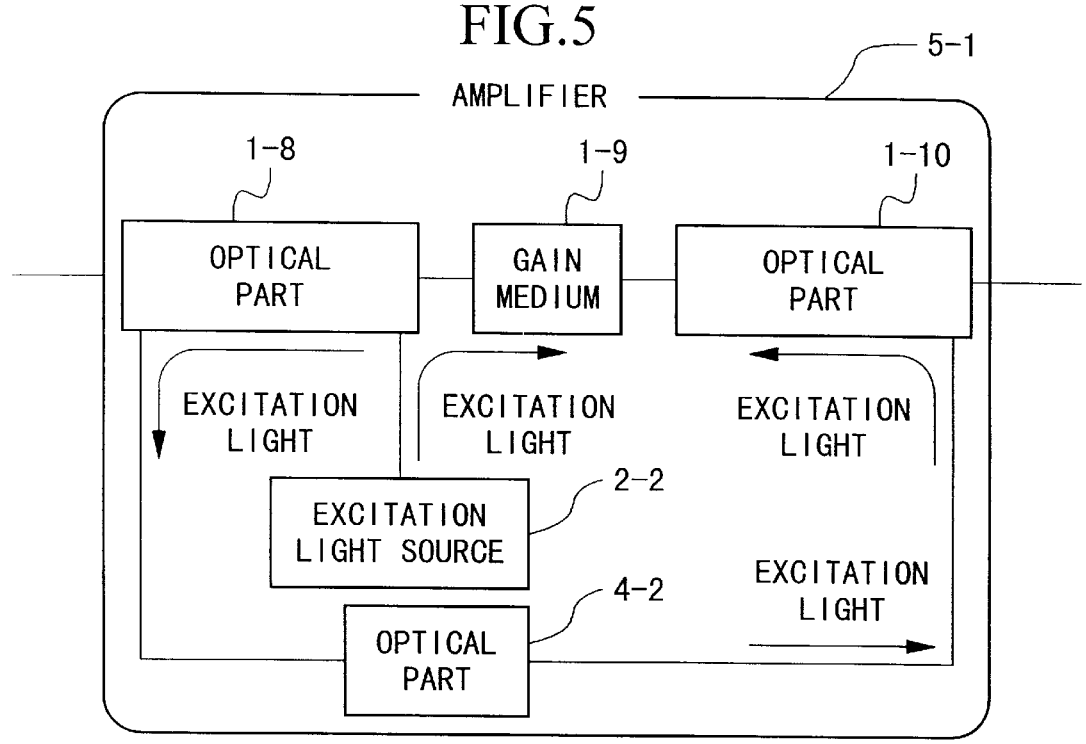
FIG. 5 is a block diagram of a fifth structure of this invention.

FIG. 5 shows the fifth structure of the present invention. The structure is analogous to that of FIG. 4 (the fourth structure of the present invention), but the propagation direction of the laser oscillation beam is reversed. At this time, the optical part 1-8 and optical part 1-10 have a multiplexer and demultiplexer respectively for the laser oscillation beam, but there is the new possibility that these are optical circulators, etc., which is a directional multiplexer-demultiplexer, and the efficiency is good. Because the laser oscillation beam is propagated in a direction reverse to that of the signal beam, is it possible to set the wavelength of the laser oscillation light irrespective of the wavelength of the signal beam, and degree of optionality of the components is increased, which is advantageous.

Figure 6:
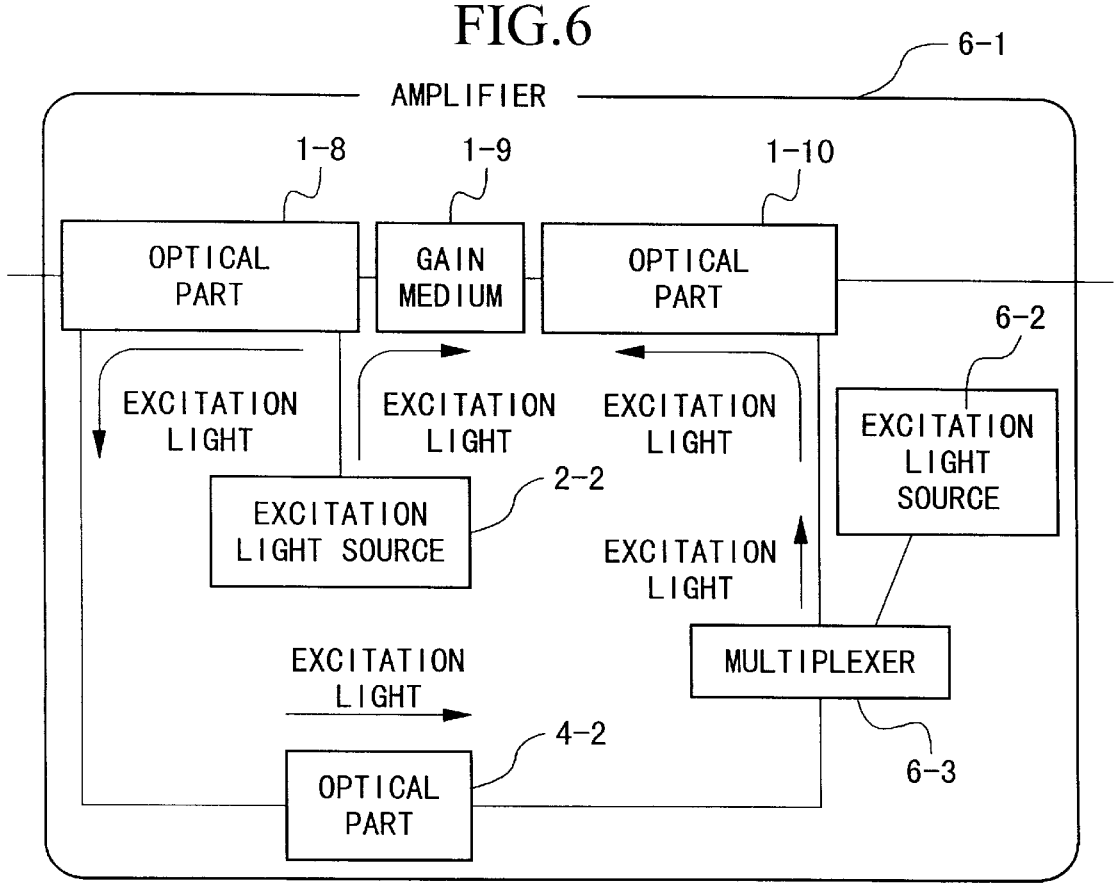
FIG. 6 is a block diagram of a sixth structure of this invention.

FIG. 6 shows the sixth structure of the present invention. The structure is analogous to that of FIG. 5 (the fifth structure of the present invention), but an excitation light source is newly installed, and the excitation light is supplemented by using the path of a laser ring. Therefore, it is possible to increase the total excitation light strength, and increase the saturation output of the optical amplifier.

Above, the first through sixth structures of the present invention have been shown, but below, in order to clarify the differences with the related technology, the structure of a typical example of the related technology and the present invention and the gain characteristics when using these structures are explained referring to the figures. The gain medium is an erbium-doped fiber ($Er^{3+}$ doped fiber: EDF). The erbium doping concentration is 1000 ppm, and the unsaturated absorption coefficient of the signal beam at 1550 nm is 1 dB/m.

Figure 11B:
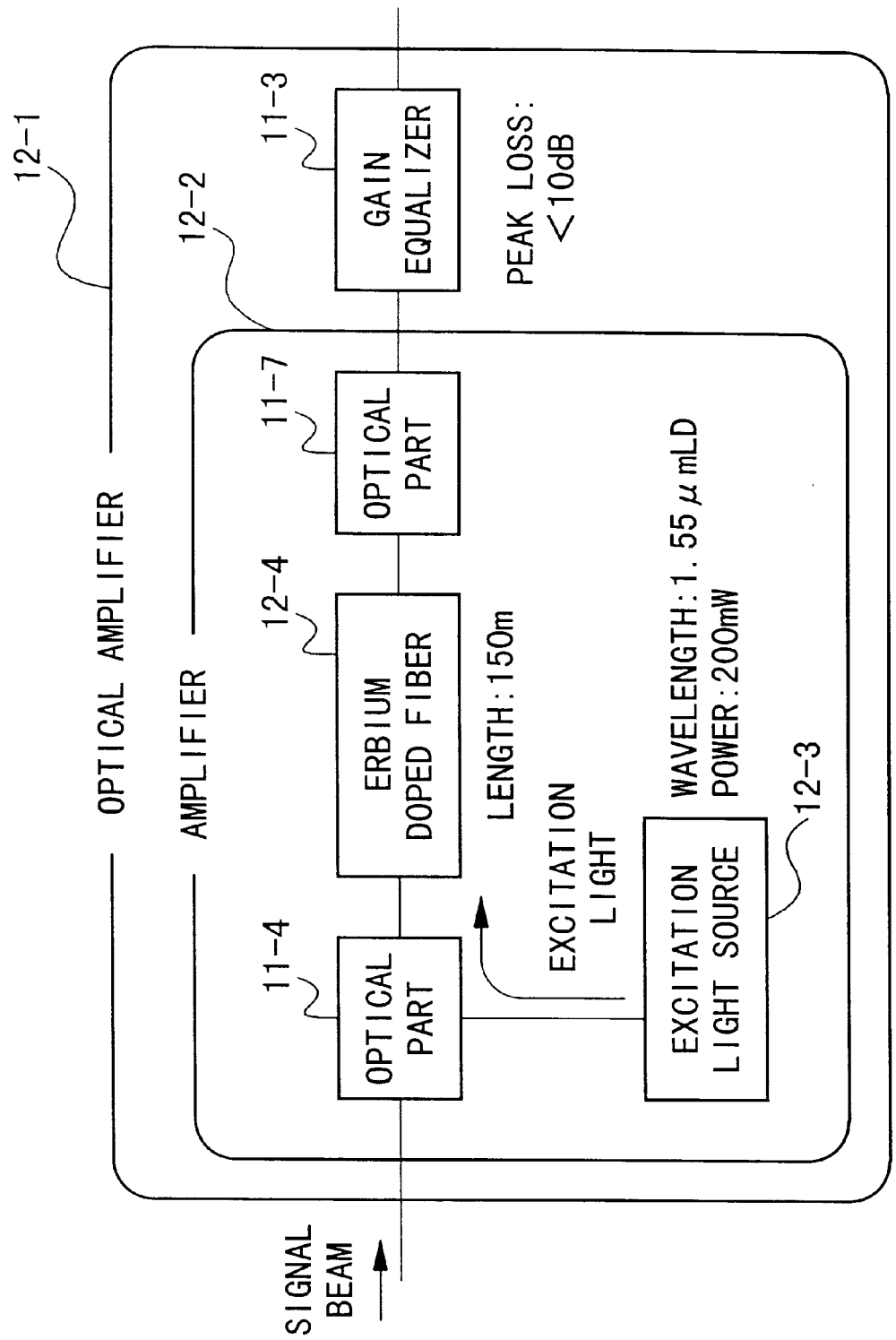
Figure 12A:
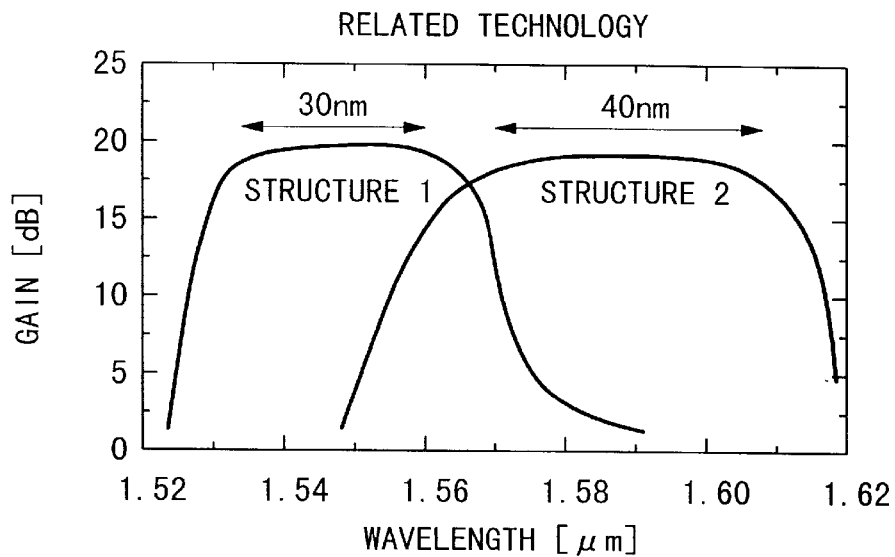
FIGS. 12A and 12B are graphs showing the characteristics of the present invention and the typical example of the related technology.

FIG. 11A and FIG. 11B show a first and second structure of a typical example of the related technology. FIG. 11 A is a first typical example of the related technology wherein the excitation wavelength is 1.48 $\mu$m. The length of the EDF 11-6 is 50 m, the excitation light power is 100 mW, and the peak loss of the gain equalizer 11-3 is 10 dB or less. The wavelength dependency of the gain under these conditions is shown in FIG. 12A. The flattened-gain is 20 dB, and the flattened bandwidth is 30 nm (1535~1565 nm).

FIG. 11B is a second typical example of the related technology whose excitation wavelength is 1.55 $\mu$m. The length of the EDF 12-4 is 150 m, the excitation light power is 200 mW, and the peak loss of the gain equalizer 11-3 is 10 dB or less. The wavelength dependency of the gain (the gain spectrum) under these conditions is shown in FIG. 12A. The flattened gain is 20 dB and the flattened bandwidth is 40 nm (1570~1610 nm).

Figure 12B:
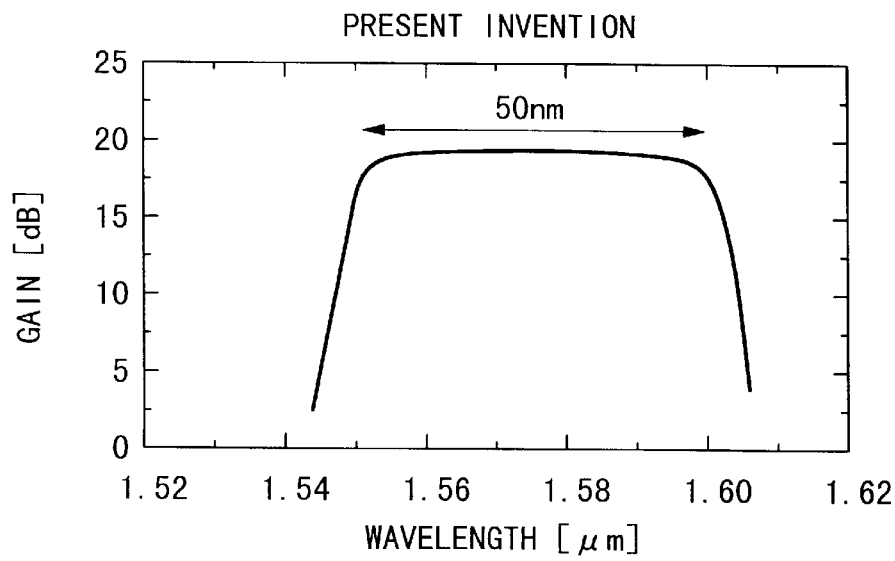
Figure 13:
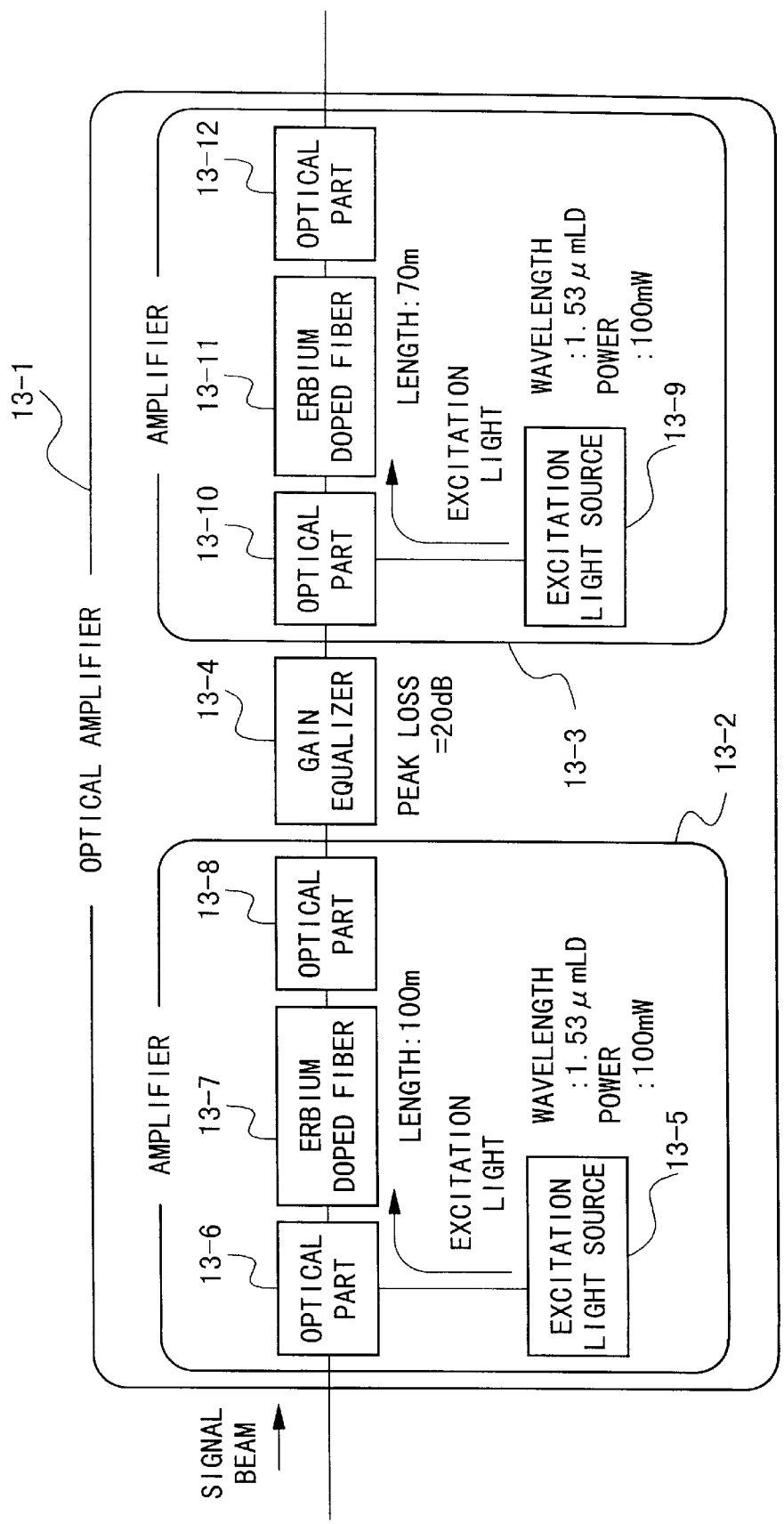
FIG. 13 is a block diagram showing the structure of a typical example of the present invention.

FIG. 13 shows the structure of a typical example of the present invention. It is a two-stage amplifier structure, wherein the length of the pre-stage EDF 13-7 is 100 m, and the length of the post-stage EDF 13-11 is 70 m. In addition, the gain of the pre-stage EDF 13-7 is 25 dB, and the gain of the post-stage EDF 13-11 is 15 dB. The peak loss of the gain equalizer 13-4 disposed therebetween is 20 dB. The total gain spectrum is shown in FIG. 12B. The flattened-gain is 20 dB, and the flattened-bandwidth is 50 nm (1550–1600 nm).

As is clear by comparing the gain spectrum of the typical examples of the related technology and the present invention described above, by using the structure of the present invention, the flattened bandwidth is remarkably widened.

As described above, in the present invention the total gain is expanded without the influence of gain degradation due to laser oscillation and amplified spontaneous light emission by dividing the gain medium in two or three or more places and installing it, and at the same time, a bandwidth having a gain of a certain constant or greater has been increased in comparison with the related technology. In addition, by making the loss value of the gain equalizer large, it is possible to broaden the gain-flattened bandwidth in comparison to the related technology. Furthermore, because the structure installs the gain medium on post-stage of the gain equalizer, even if the loss value of the gain equalizer becomes large, it is possible to maintain the large saturation output of the optical amplifier, and it overcomes the drawback of the related technology that the saturation output of the optical amplifier is remarkably lowered when the loss value of the gain equalizer becomes large.

[First Embodiment]

Below, the first embodiment of the present invention is explained referring to the figures.

Figure 14:
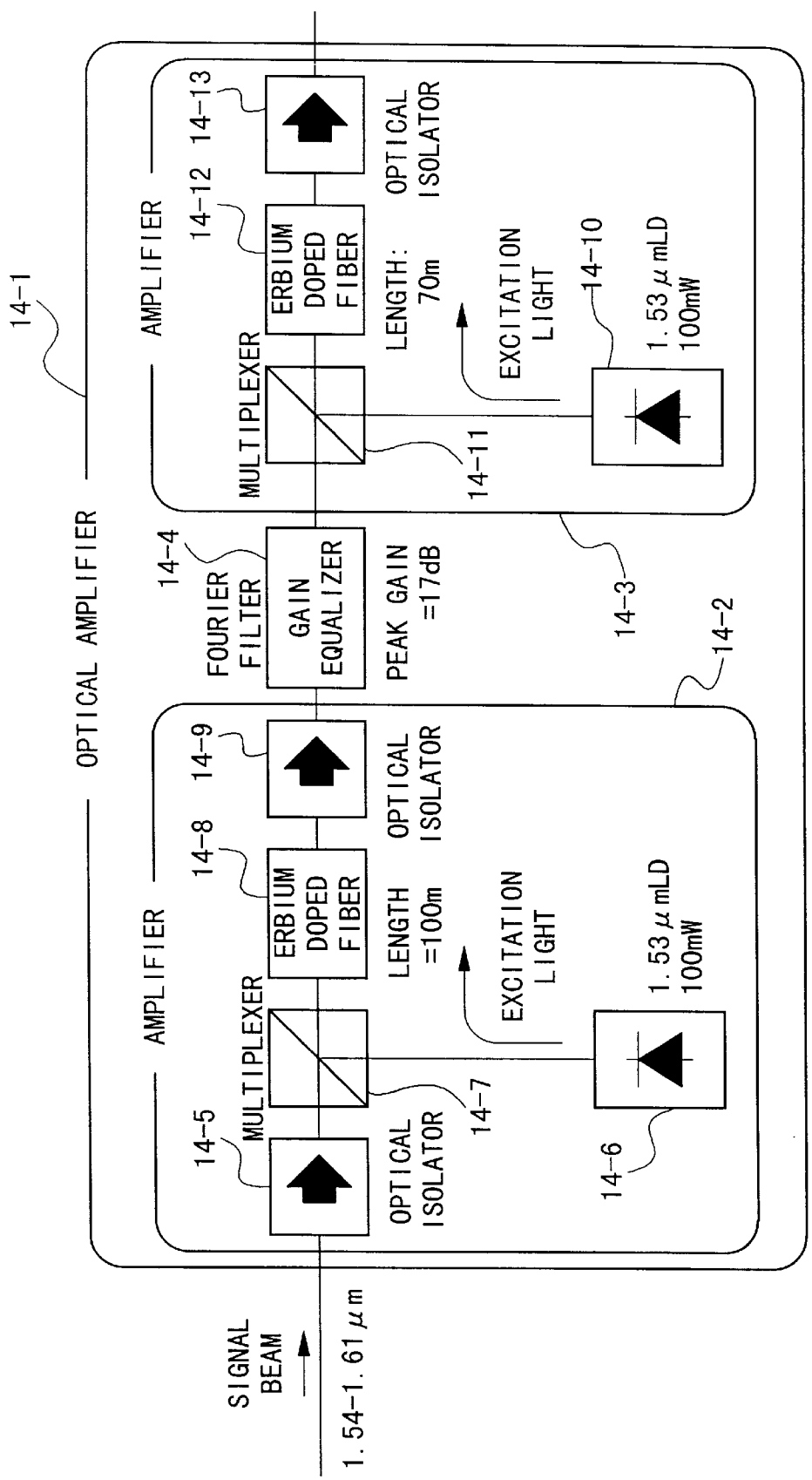
FIG. 14 is a block diagram showing an example of the structure of a wide bandwidth optical amplifier according to the first embodiment of the present invention.

FIG. 14 is a block diagram showing an example of a structure of a wide bandwidth optical amplifier according to the first embodiment of the present invention.

In this embodiment, an erbium doped fiber ($Er^{3+}$ doped fiber: EDF) is used as a gain medium, and has the structure of a two-stage amplifier. The concentration of the erbium dopant is 1000 ppm, and the unsaturated absorption coefficient of the signal beam at 1550 nm is 1 dB/m. The length of the pre-stage EDF 14-8 is 100 m, and the length of the post-stage EDF 14-12 is 70 m. The excitation light sources 14-6 and 14-10 is a 1.53 $\mu$m semiconductor laser (LD), and the excitation light power is 100 mW. The excitation light and multiplexers 14-7 and 14-11 are an induction multi-layer film filter, and the gain equalizer 14-4 is a split beam Fourier filter (Fourier filter). The peak loss of the gain equalizer (Fourier filter) 14-4 is 17 dB. The gain of the pre-stage EDF 14-8 is 25 dB, and the gain of the post-stage EDF 14-12 is 15 dB. Two optical isolator are installed in the pre-stage amplifiers and one optical isolator is installed in post-stage amplifier for preventing laser oscillation. Moreover, parameters, which makes flattened-gain bandwidth wide and is effective at the wide wavelength band of the gain medium, is set at the gain equalizer 14-4.

Figure 15:
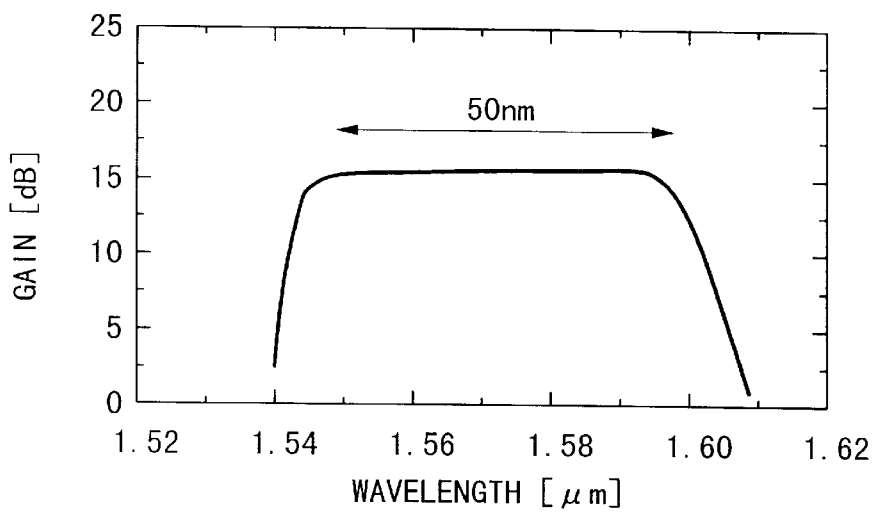
FIG. 15 is a graph showing the gain spectrum of the first embodiment.

The gain spectrum of the first embodiment of the present invention is shown in FIG. 15. A flattened gain of 17 dB and a gain-flattened bandwidth of 50 nm are obtained. In addition, the saturation output with a multiple wavelength signal output (for example, 20 channels, or 100 channels) at 1.54~1.61 $\mu$m is 15 dBm, which is sufficiently high. However, the insertion loss of the multiplexers 14-7 and 14-11, optical isolators 14-9 and 14-13, and the gain equalizer (Fourier filter) 14-4 are each 1 dB.

[Second Embodiment]

Next, the second embodiment of the present invention will be explained.

Figure 16:
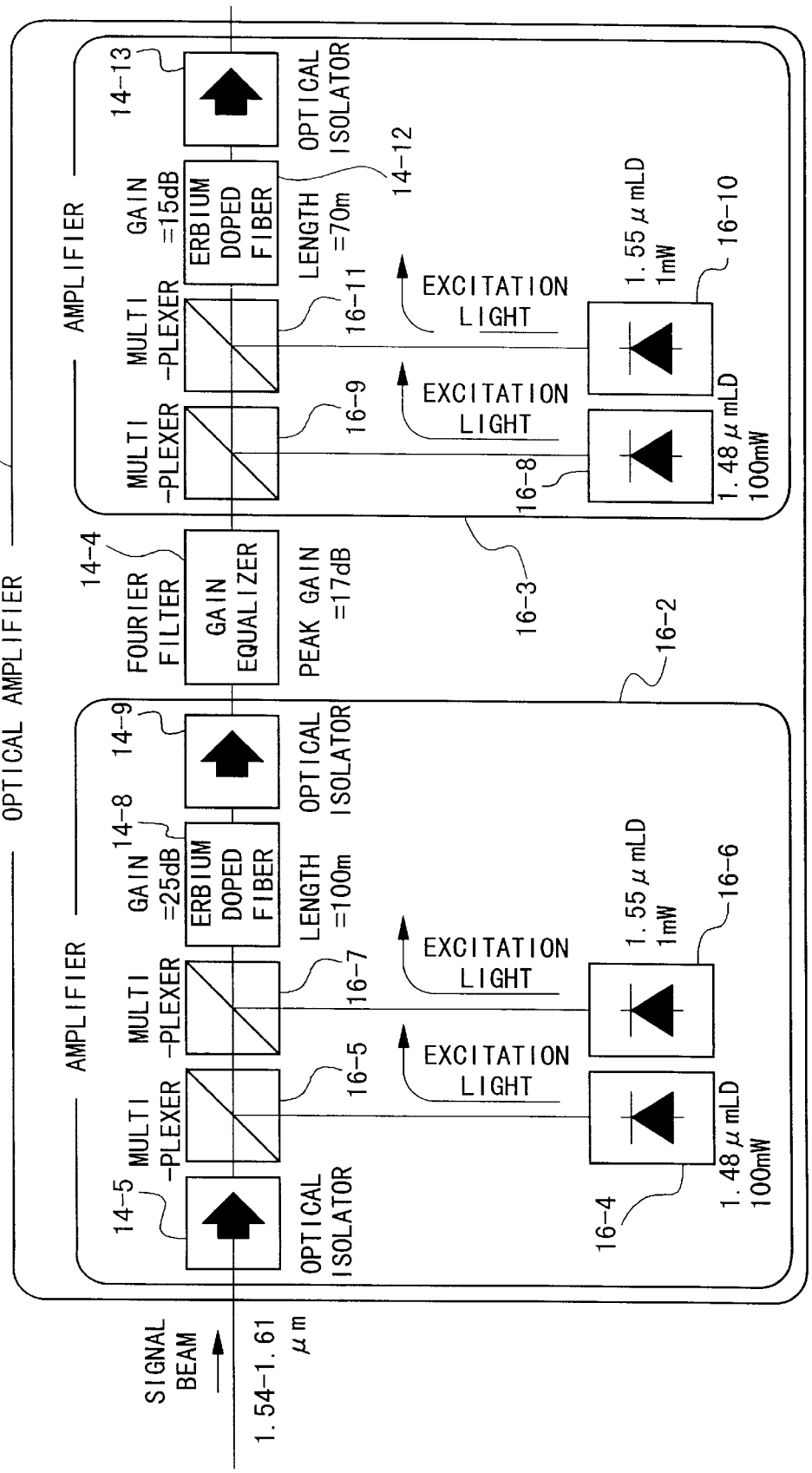
FIG. 16 is a block diagram showing an example of the structure of a wide bandwidth optical amplifier according to the second embodiment.

FIG. 16 is a block diagram showing an example of a structure of a wide bandwidth optical amplifier according to the second embodiment of the present invention.

The excitation light sources are different from those in FIG. 14 (the first embodiment). The excitation light sources 16-4 and 16-8 are LDs having a wavelength of 1.48 $\mu$m and an output power of 100 mW, and the excitation light sources 16-6 and 16-10 are LDs having a wavelength of 1.55 $\mu$m, and an output optical power of 1 mW. The excitation light of 1.48 $\mu$um input into the EDFs 14-8 and 14-12 is absorbed by each EDF 14-8 and 14-12, and the 1.55 $\mu$m excitation light is amplified by each EDF 14-8 and 14-12. As a result, in the upper part of each EDF 14-8 and 14-12, a 1.48 $\mu$m excitation light power is dominant, while in the lower part, a 1.55 $\mu$m excitation light power is dominant. In total, it is possible to obtain the same gain as the first embodiment with the excitation light having 1.53 $\mu$m wavelength.

Figure 17:
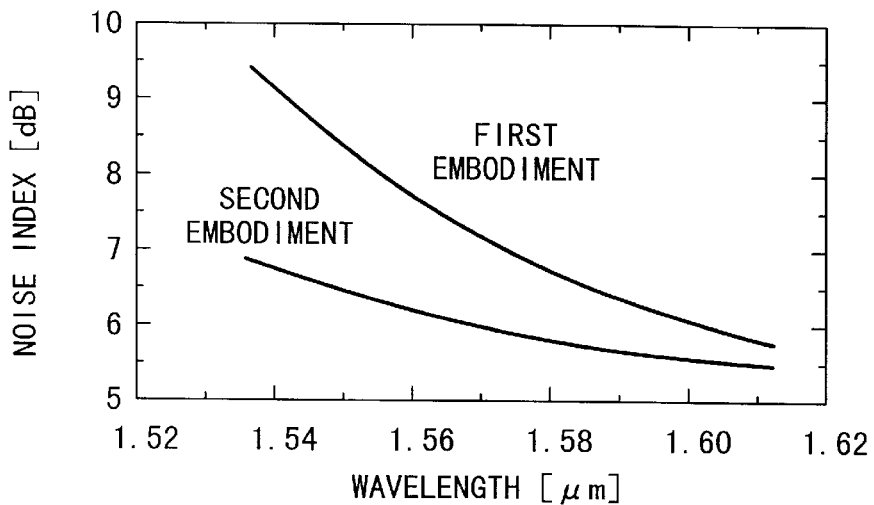
FIG. 17 is a graph showing the noise index spectrum of the first embodiment and the second embodiment.

Furthermore, because the population inversion at the upper part was raised by the excitation light having 1.48 $\mu$m wavelength, the noise characteristics increased. Specifically, the noise index lowered. FIG. 17 shows the dependency of the noise index upon the signal beam wavelength in the second and first embodiments. It is clear that the noise index of the second embodiment has become lower.

[Third Embodiment]

Next, the third embodiment of the present invention is explained.

Figure 18:
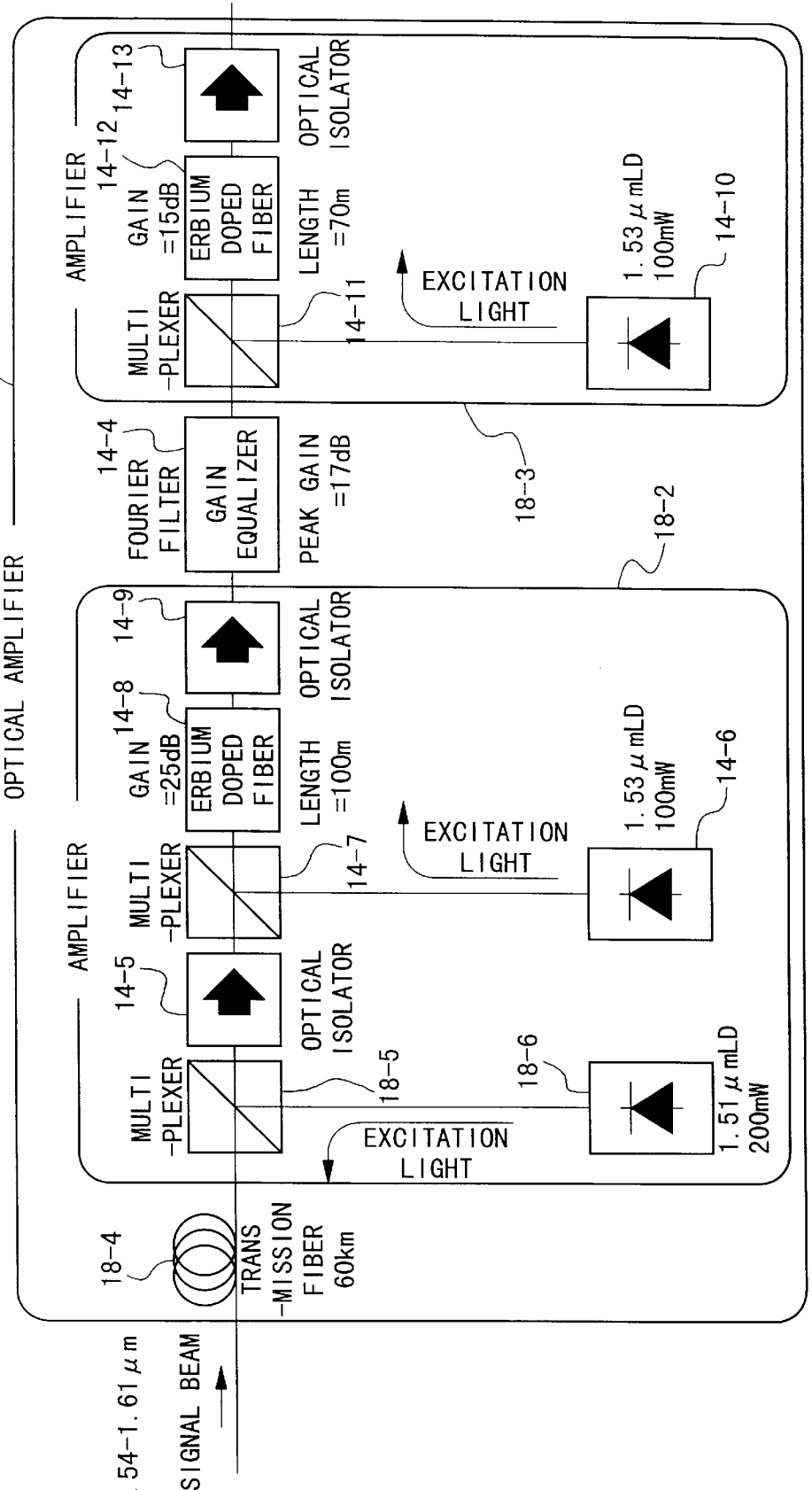
FIG. 18 is a block diagram showing an example of the structure of a wide bandwidth optical amplifier according to the third embodiment of this invention.

FIG. 18 shows a block diagram of an example of the structure of a wide band optical amplifier according to the third embodiment of the present invention.

Figure 19:
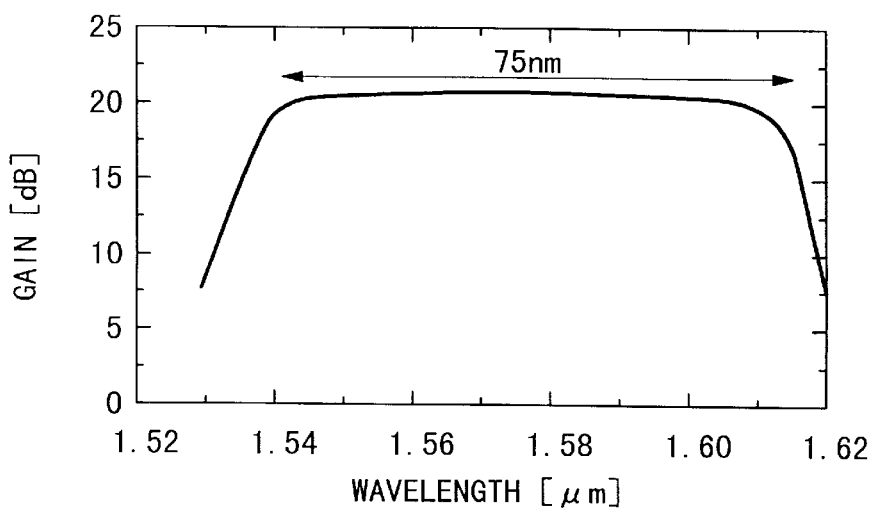
FIG. 19 is a graph showing the gain spectrum of the third embodiment.

Compared to FIG. 14 (the first embodiment), the present embodiment further comprises a Raman amplifier. The transmission fiber (silica fiber) 18-4 is excited by an excitation light source (LD) with a wavelength of 1.51 μm and an output optical power of 200 mW. The transmission fiber 18-4 is a 60 km dispersion-shifted fiber. The Raman gain at 1.61 μm is 10 dB. FIG. 19 shows the gain spectrum according to the present embodiment. Compared to the first embodiment, the flattened gain is raised 5 dB and the gain bandwidth is raised 25 nm.

Moreover, an optical circulator, which is a directional coupler, can be used as a multiplexer 18-5. The reason is that because the directions of the excitation wavelength (1.51 μm) and the signal beam are different with respect to the transmission fiber, the multiplexing of light by an optical circulator can be easily carried out. In addition, compared to using a wavelength division multiplexing coupler as a multiplexer 18-5, by using an optical circulator, it is possible to amplify a signal beam near the excitation wavelength, and it is also possible to broaden the bandwidth which optically amplifies.

[Fourth Embodiment]

Next the fourth embodiment of the present invention will be explained.

Figure 20:
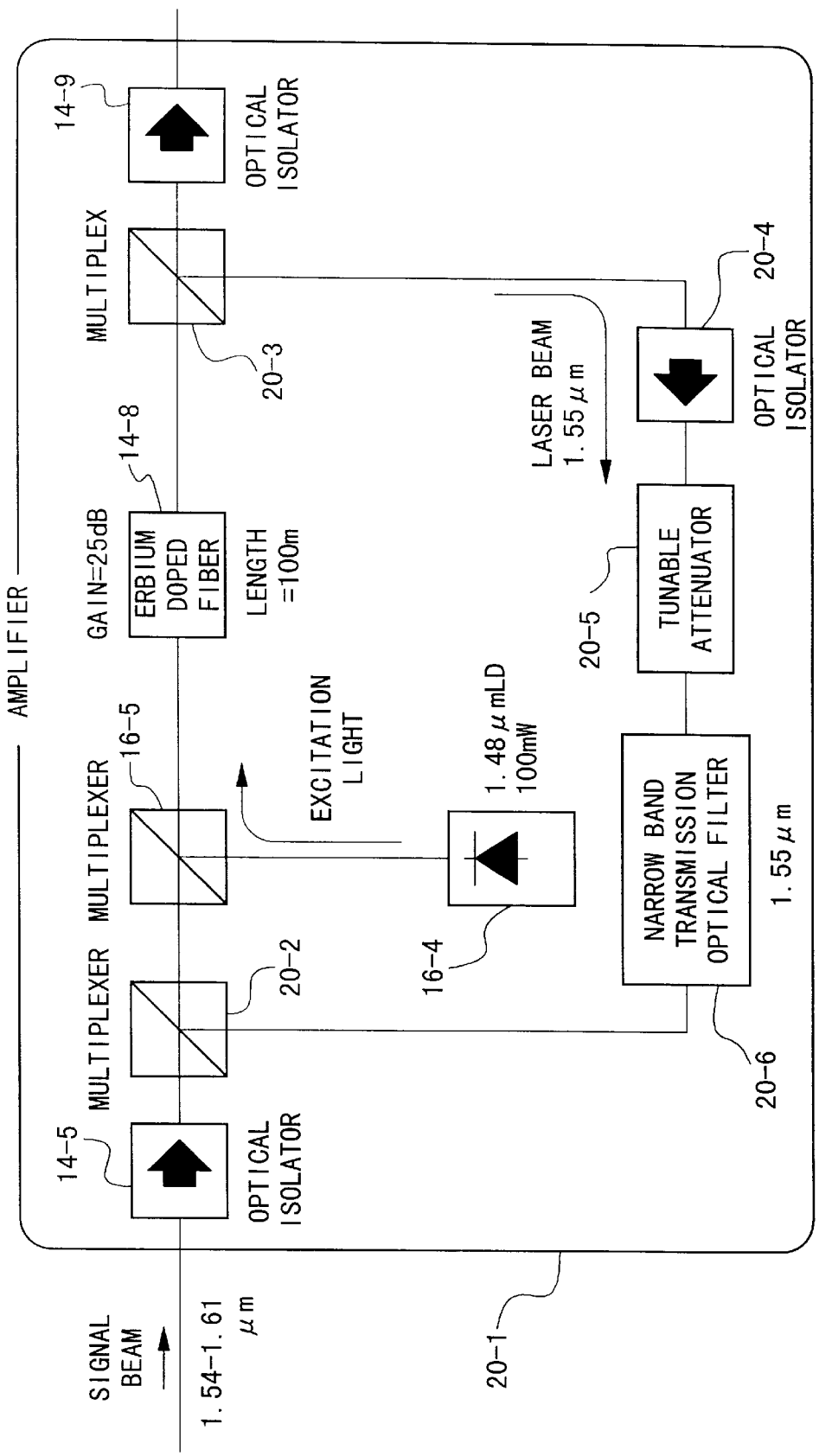
FIG. 20 is a block diagram showing an example of the structure of a wide bandwidth optical amplifier according to the fourth embodiment of this invention.

FIG. 20 is a block diagram showing an example of a structure of a wide bandwidth optical amplifier according to the fourth embodiment of the present invention.

Compared to FIG. 16 (the second embodiment), the present embodiment has the structure of the excitation unit of the EDF in the pre-stage and post-stage. Therefore, in FIG. 20, only the pre-stage amplifier 20-1 is shown. The structure of the post-stage (not shown) is the same as the structure of the pre-stage amplifier 20-1. The excitation light source 16-4 is an LD with a wavelength of 1.48 μm and an output light power 100 mW. Instead of using an LD with a wavelength of 1.55 μm, a high power laser oscillation beam with a wavelength of 1.55 μm is oscillated in the ring laser. A ring laser comprises EDF 14-8, ring laser multiplexer (multiplexers 20-2 and 20-3), a narrow bandwidth transmission optical filter 20-6, a tunable attenuator 20-5, and an optical isolator 20-4. The multiplexers 20-2 and 20-3 can use wavelength division multiplex coupler which only multiplexes and demultiplexes a laser oscillator optical wavelength in a narrow bandwidth. The obtained amplification characteristics are the same as those in the second embodiment. In the present structure, because there is only one excitation light source (LD), it has the advantages that the structure is simple and stable.

[Fifth Embodiment]

Next, the fifth embodiment of the present invention is explained.

Figure 21:
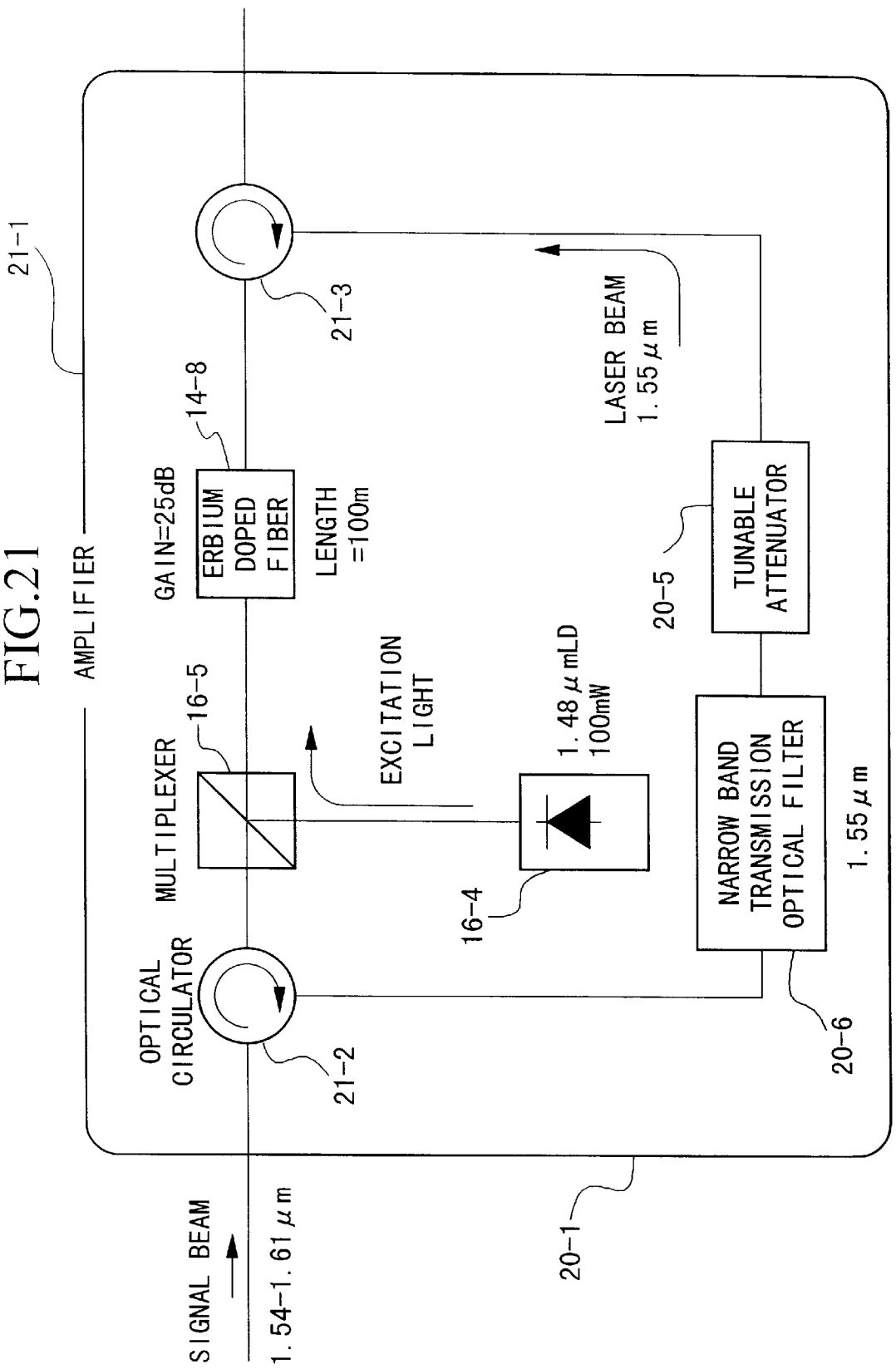
FIG. 21 is a block diagram showing an example of the structure of a wide bandwidth optical amplifier according to the fifth embodiment of this invention.

FIG. 21 is a block diagram showing an example of a structure of a wide bandwidth optical amplifier according to the fifth embodiment of the present invention.

Compared to FIG. 20 (fourth embodiment), the present embodiment has optical circulators 21-2 and 21-3 in the ring laser instead of an optical isolator 20-4 and ring laser multiplexers (multiplexers 20-2 and 20-3). It is advantageous to use the optical circulators 21-2 and 21-3, because the number of optical parts is decreased and the structure is simplified.

[Sixth Embodiment]

Next, the sixth embodiment of the present invention is explained.

Figure 22:
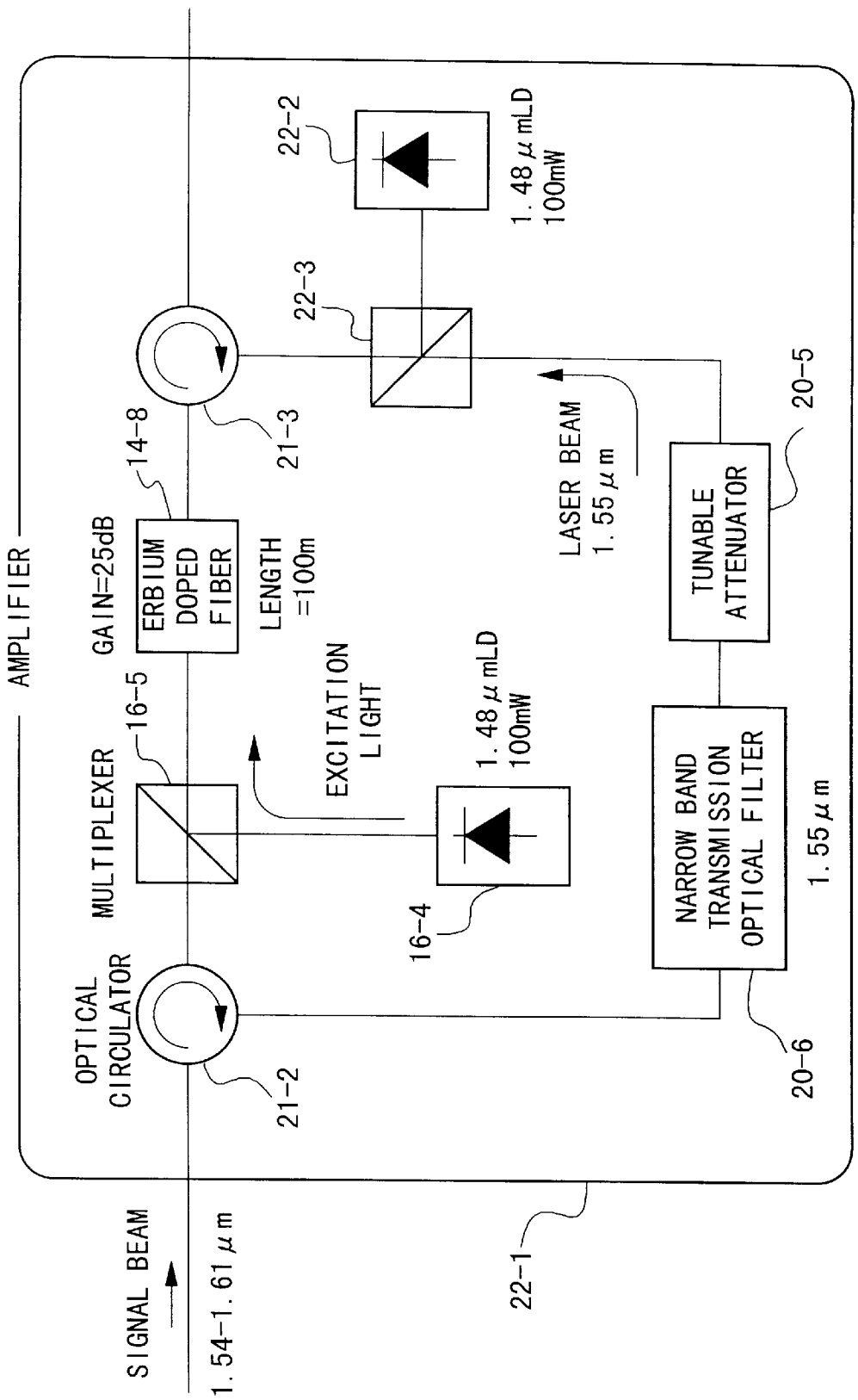
FIG. 22 is a block diagram showing an example of the structure of a wide bandwidth optical amplifier according to the sixth embodiment of this invention.

FIG. 22 is a block diagram showing an example of a structure of a wide bandwidth optical amplifier according to the sixth embodiment of the present invention.

Compared to FIG. 21 (the fifth embodiment), the present embodiment has one more excitation light source in the ring laser loop. In this manner, there is the advantage that the total excitation optical power is increased without degradation of the signal beam gain, and the signal beam saturation output can be increased.

Moreover, in the above-described first through sixth embodiments, an example was explained wherein the amplifier has two stages, and a gain equalizer is disposed therebetween, but in the amplifiers explained in each embodiment, it is possible to provide N stages (N being an integer equal to or greater than 2), and provide a gain equalizer between each of the amplifiers.

Above, the embodiments of the present invention are explained in detail referring to the figures, but a concrete structure is not limited to these embodiments, and changes in design within the scope not departing from the spirit of the invention are included in this invention.

Above, according to the present invention, in comparison with the related technology, there are the effects that the gain flattened bandwidth is wide, and it is possible to realize a high saturation output, low noise optical amplifier.

Next, an optical amplifier provided with a Raman amplifier using a high nonlinear fiber or a dispersion compensation fiber as a Raman amplifier medium will be explained in the seventh through thirteenth embodiments.

[Seventh Embodiment]

Figure 29:
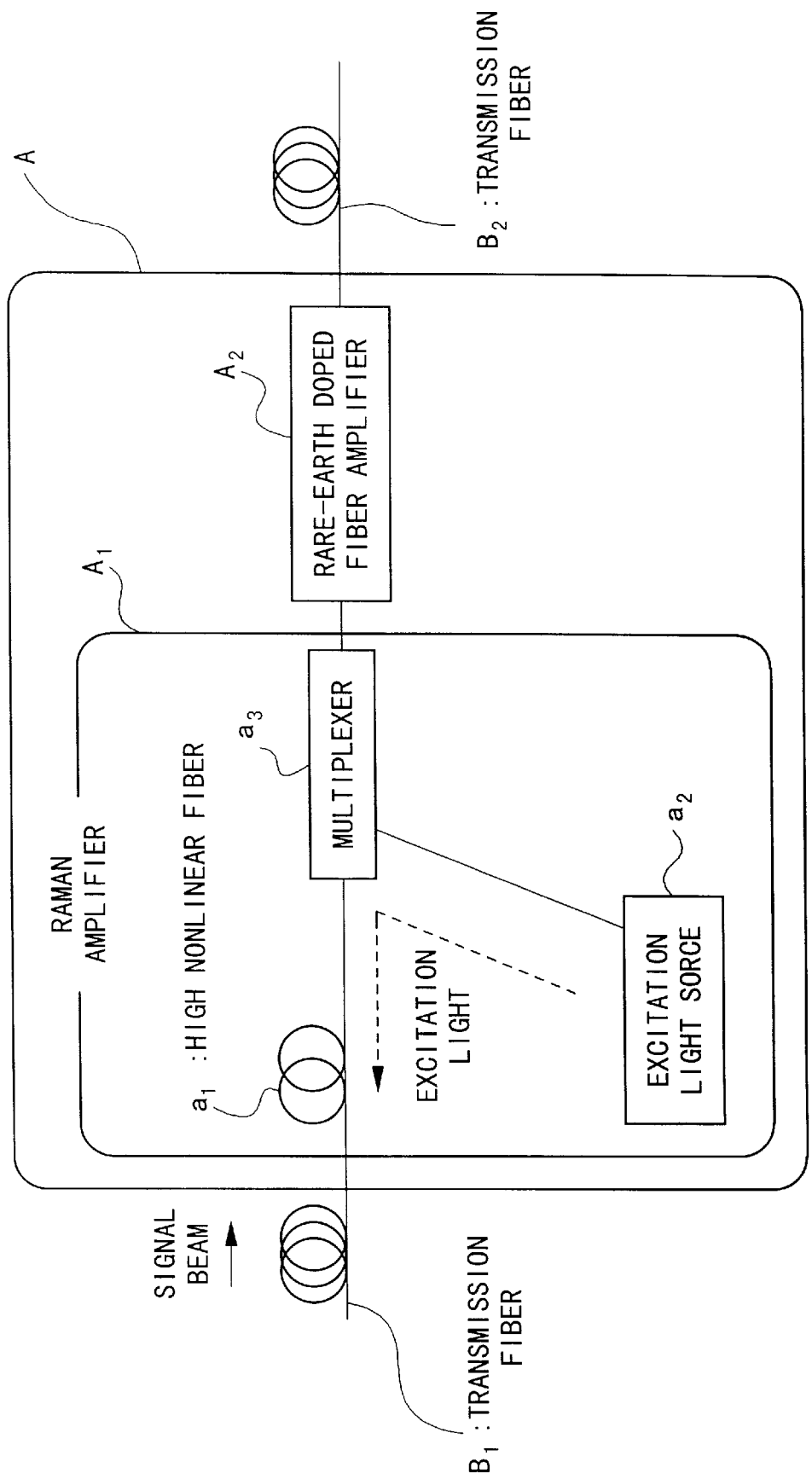
FIG. 29 is a block diagram of a structure of a seventh embodiment of the optical amplifier in the optical amplifier or an optical transmission system using it according to this invention.

First, referring to FIG. 29, the seventh embodiment of the optical amplifier will be explained. Moreover, this seventh embodiment relates to a most basic structure of an optical amplifier provided with a Raman amplifier using a high nonlinear fiber as a Raman amplifier medium. As shown in this figure, the optical amplifier A of the present embodiment comprises a Raman amplifier A1 and a rare-earth doped fiber amplifier A2. In the optical amplifier A structured in this manner, a transmission fiber B1 (transmission path) for inputting an optical signal and a transmission fiber B2 (transmission path) for outputting an amplified optical signal are connected together.

In addition, the above-described Raman amplifier A1 comprises a nonlinear fiber a1 which is the Raman amplifying medium, an excitation light source 2a which generates an excitation light for exciting the high nonlinear fiber a1, and a multiplexer a3. To one end of the high nonlinear fiber a1, the above transmission fiber B1 is connected, and the optical signal is incident thereupon, and to the other end the multiplexer a3 is connected so that the excitation light supplied from the excitation light source a2 is incident thereupon.

That is, in contrast to the direction of incidence of the optical signal, the multiplexer a3 makes the excitation light incident on the high nonlinear fiber a1 from the opposite direction, and at the same time, the optical signal amplified by the high nonlinear fiber a1 is output to the rare-earth doped fiber amplifier A2. This rare-earth doped fiber amplifier A2, as described above, can provide an optical amplifying action by reflecting the excitation light into the rare-earth doped fiber, and can provide a gain flattening means such as a gain equalizer.

When structuring an optical amplifier A from a Raman amplifier A1 and a rare-earth doped fiber amplifier A2 in this manner, by adjusting the Raman gain of the Raman amplifier A1 for offsetting the decrease in the gain spectrum at the long wavelength region in the rare-earth doped fiber A2, it is possible that the gain realizes a flattened region over a wide bandwidth.

In this manner, in using a high nonlinear fiber a1 as a Raman amplifier medium, the present embodiment is very different from the optical amplifier which uses an optical transmission fiber shown in the third embodiment as the Raman amplifier medium. Generally, a high nonlinear fiber has a mode radius which is small in comparison to the transmission fiber usually used, and in addition, because the concentration of the dopant is high, the efficiency of the nonlinear effects of the light are high, and thus it is possible to carry out highly efficient Raman amplification even in a comparatively short fiber length and low excitation light power. By such a high nonlinear fiber, a rate of Raman amplification proportionate to the square of the core diameter and the concentration of the dopant can be obtained. Therefore, because it is possible, for example, to have a fiber length of several kilometers with in-line optical amplifiers, it is possible to construct the lumped parameter optical amplifier, and at the same time, it is possible to construct the optical amplifier having an efficient Raman amplifier.

For example, as typical values for the parameters of the Raman amplifier A1 structured from this kind of high nonlinear fiber a1, the mode diameter and fiber length of the high nonlinear fiber a1 are respectively 4 μm and 1 km, and the power of the excitation light from the excitation source a2, which is a 1.51 μm excitation semiconductor laser, is 200 mW.

[Eighth Embodiment]

Figure 30:
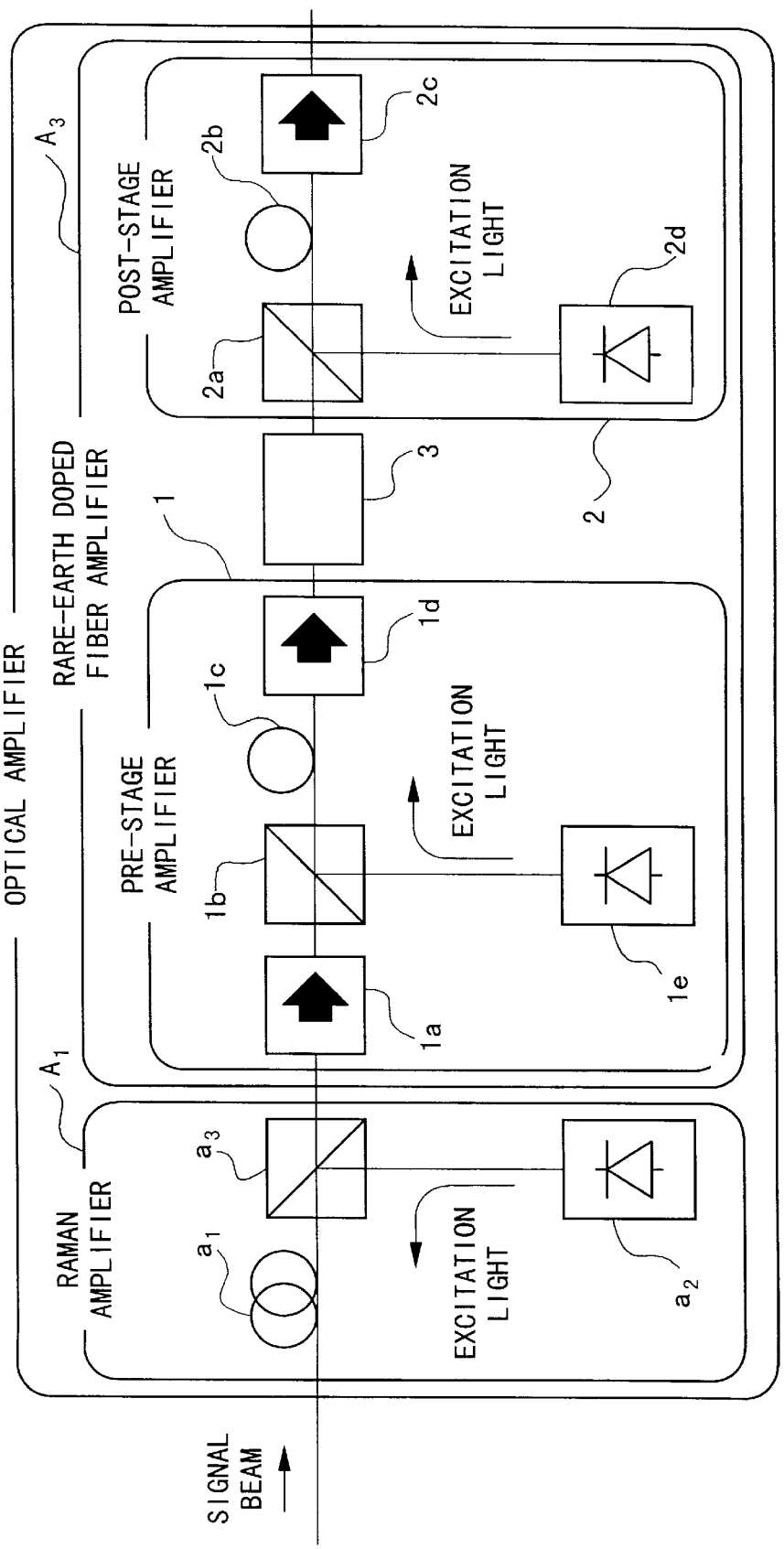
FIG. 30 is a block diagram of a structure of a eighth embodiment of the optical amplifier in the optical amplifier or an optical transmission system using it according to this invention.

Referring to FIG. 30, the eight embodiment of the optical amplifier of the present invention will be explained. Moreover, this embodiment relates to a variation of the structure of the rare-earth doped fiber amplifier A in the above-described seventh embodiment. Therefore, the Raman amplifier is the same as the above-described Raman amplifier A1, and thus the explanation of identical reference numbers is omitted.

As shown in the figure, the rare-earth doped fiber amplifier A3 in the present embodiment comprises a pre-stage amplifier 1, a post-stage amplifier 2, and a Fourier filter (split beam Fourier filter) 3 interposed therebetween. In addition, the pre-stage amplifier 1 comprises isolators 1a and 1d, a multiplexer 1b, a rare-earth doped fiber 1c, and an excitation light source 1e (a semiconductor laser); the post-stage amplifier 2 comprises a multiplexer 2a, a rare-earth doped fiber 2b, an isolator 2c, and an excitation light source 2d (a semiconductor laser).

The optical signal output from the Raman amplifier A1 is incident on the isolator 1a, and output to the Fourier filter 3 from the isolator 1d via the multiplexer 1b and then the rare-earth doped fiber 1c. In addition, the excitation light output from the excitation light source 1e is incident on the rare-earth doped fiber 1c via the multiplexer 1b. The Fourier filter 3 acts as a gain equalizing means, and the optical signal input from the pre-stage amplifier 1 is gain-equalized and output to the post-stage amplifier 2.

In addition, the optical signal emitted from Fourier filter 3 in this manner is incident on the multiplexer 2a of the post-stage amplifier 2, and emitted from the isolator 2c via the rare-earth doped fiber 2b. Additionally, in the rare-earth doped fiber 2b, the excitation light generated in the excitation light source 2d is output via the multiplexer 2a.

According to the above-described rare-earth doped fiber amplifier A3, the optical signal, which is Raman-amplified by the high nonlinear fiber a1 in the Raman amplifier A1, is optically amplified by the rare-earth doped fiber 1c, and then it is gain-equalized by the Fourier filter 6, and it is further amplified by the rare-earth doped fiber 2b.

In the present embodiment, because it is possible to construct the optical amplifier from the above-described comparatively short length high nonlinear fiber a1 and the amplifier which can carry out Raman amplification efficiently with comparatively low power excitation light and has the characteristic of a lumped-parameter, the optical amplifier can be provided with the above-described construction of a rare-earth doped fiber amplifier A3 as a post-amplifier, which is impossible in conventional construction.

Moreover, in FIG. 30, the rare-earth doped fiber amplifier A3 can be constructed from N amplifiers, explained in the first through sixth embodiments, and (N−1) gain equalizers provided therebetween (N being an integer equal to or greater than 2).

Here, in the present embodiment, the excitation light for Raman amplification is multiplexed using a multiplexer a3, but in place of the multiplexer a3 a directional coupler such as a light circulator can also be used. In this case, the isolator 1a of the pre-stage amplifier 1 is unnecessary, and it is possible to decrease the loss of the optical signal in this isolator 1a.

Moreover, the construction of the gain-flattened rare-earth doped fiber amplifier included in the present embodiment is described in detail in a Citation (H. Masuda, et al., Electron. Lett., Vol. 33, pp. 1070–1072, 1997).

[Ninth Embodiment]

Figure 31:
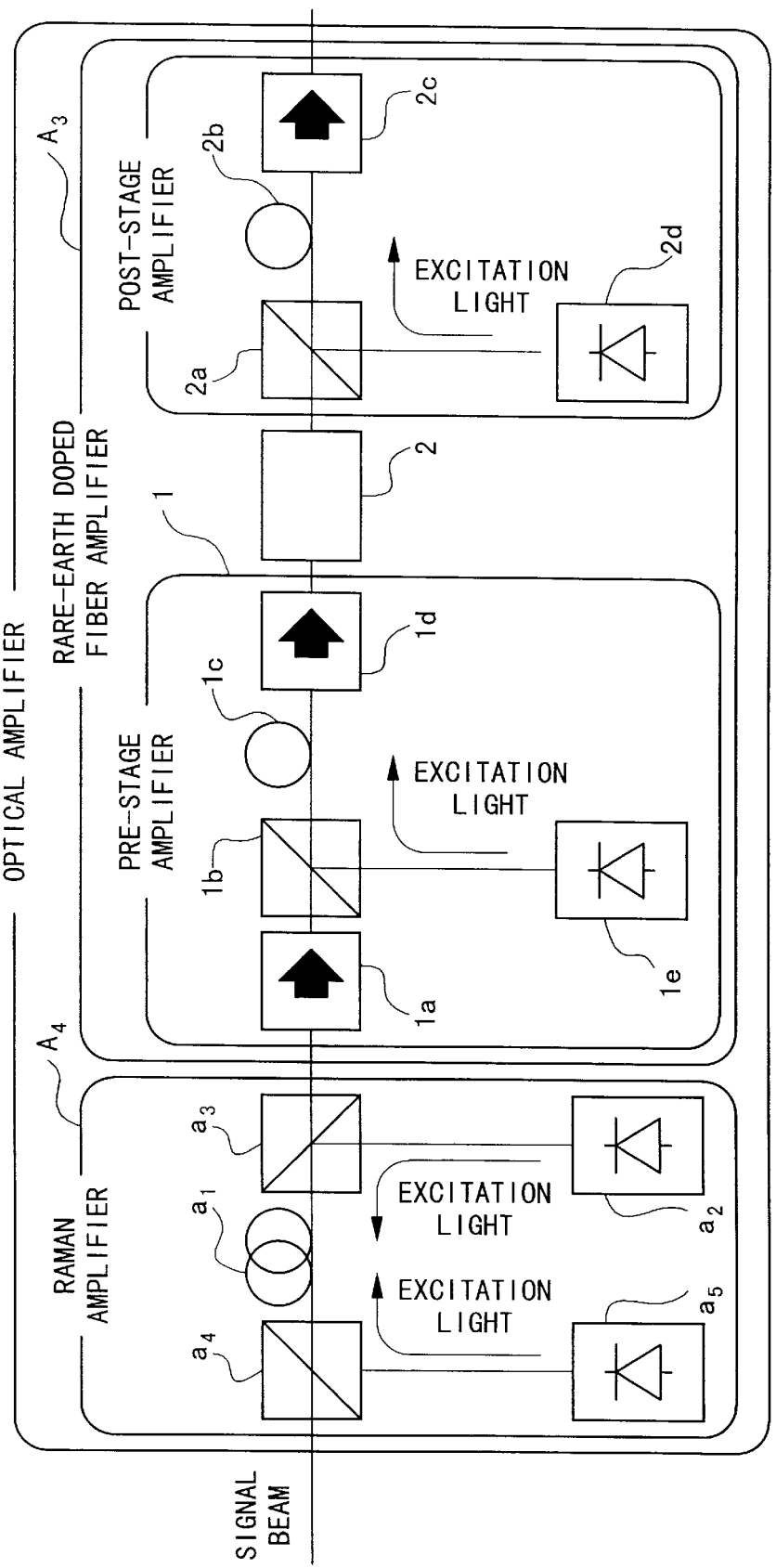
FIG. 31 is a block diagram of a structure of a ninth embodiment of the optical amplifier in the optical amplifier or an optical transmission system using it according to this invention.

Next, referring to FIG. 31, the ninth embodiment of the optical amplifier according to the present invention is explained. This embodiment alters the Raman amplifier A1 in the above-described eighth embodiment to Raman amplifier A4, and other parts of the construction are the same at that in the eight embodiment. That is, because excitation light is also input from the front of a high nonlinear fiber a1 (the input side of the optical signal), this Raman amplifier A4 is provided with a multiplexer a4 at the input end of the optical signal, and excitation light emitted from the excitation light source a5 (a second light emission source) via the multiplexer a4 is supplied to the high nonlinear fiber a1 from the front.

By adopting this kind of structure, in the case when, for example, the power of the excitation light source a2 is made equal to the power of the excitation optical source a5, for the above-described second embodiment, it is possible to supply twice the power of the excitation light a5 to the high nonlinear fiber a1, so in a state of comparative suppression of the power of each of the light sources a2 and a5, it is possible to Raman amplify the optical signal with even more efficiency. Moreover, of course, it is not necessary that the power of the excitation light source a2 and the power of the excitation light source a5 be equal.

[Tenth Embodiment]

Figure 32:
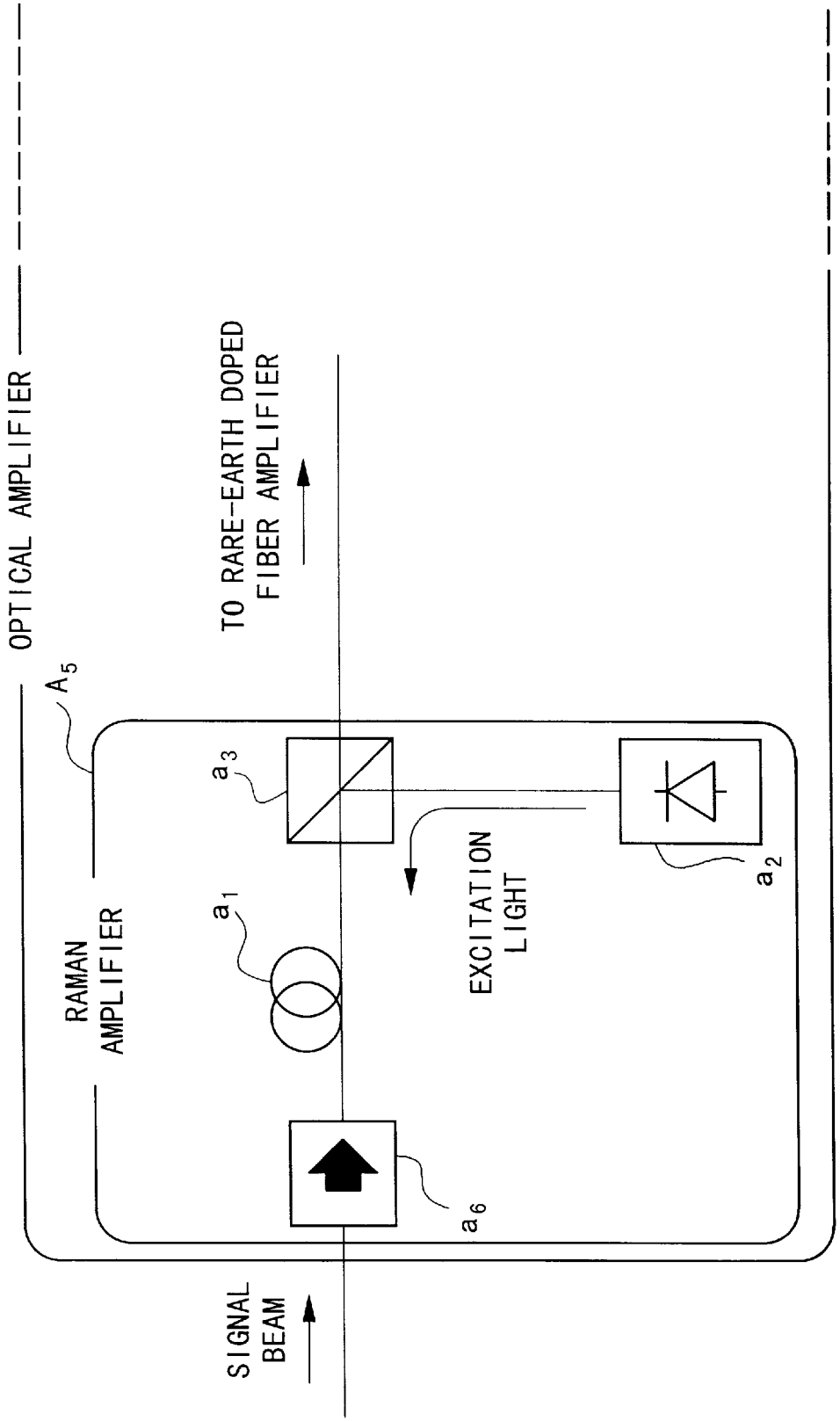
FIG. 32 is a block diagram of a structure of a tenth embodiment of the optical amplifier in the optical amplifier or an optical transmission system using it according to this invention.

FIG. 32 shows the construction of the tenth embodiment of the optical amplifier of the present invention.

The present embodiment relates to a variation of the structure of the Raman amplifiers for each of the above-described embodiments. That is, in contrast to the Raman amplifier shown in the above FIG. 29, the Raman amplifier A5 of the present embodiment is characterized in being provided with an isolator a6 on the input terminal of the optical signal, that is, the input terminal of the high nonlinear fiber a1. By adopting this structure, it is possible to stop the leaking of the excitation light transiting the high nonlinear fiber a1 into the transmission fiber.

[Eleventh Embodiment]

Figure 33:
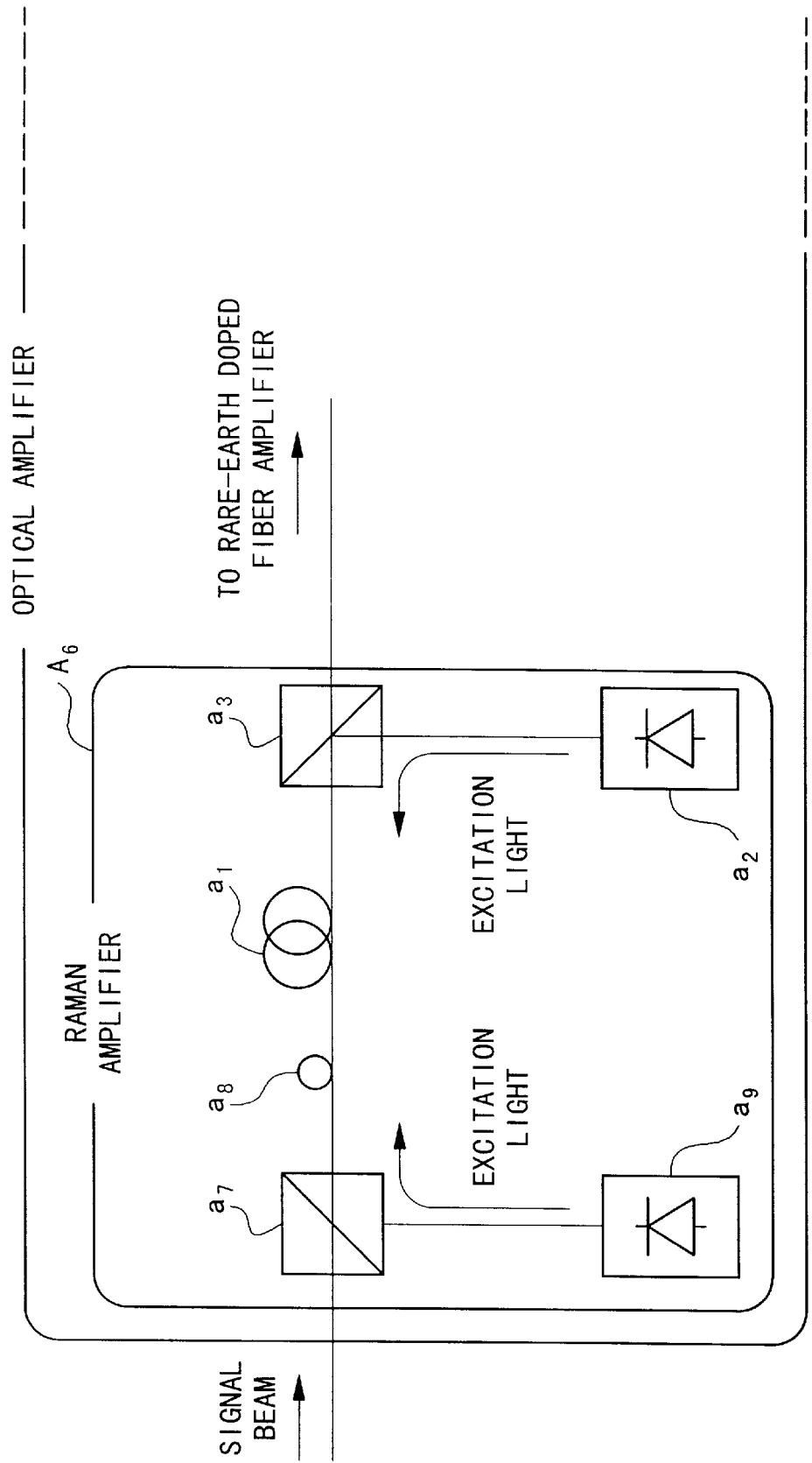
FIG. 33 is a block diagram of a structure of a eleventh embodiment of the optical amplifier in the optical amplifier or an optical transmission system using it according to this invention.

FIG. 33 shows the construction of the eleventh embodiment of the optical amplifier of the present invention.

This embodiment is also related to a variation of the construction of a Raman amplifier similar to that in the above-described tenth embodiment. That is, in contrast with the Raman amplifier A1 shown in the above FIG. 29, the Raman amplifier A6 of the present embodiment is characterized in being provided with a multiplexer a7 at the input terminal of the optical signal, and additionally provided with a rare-earth doped fiber a8 between the multiplexer a7 and the high nonlinear fiber a1. Furthermore, it is characterized in being provided with an excitation light source a9 which supplies excitation light to the high nonlinear fiber a1 and the rare-earth doped fiber a8 via the multiplexer a7.

Figure 28:
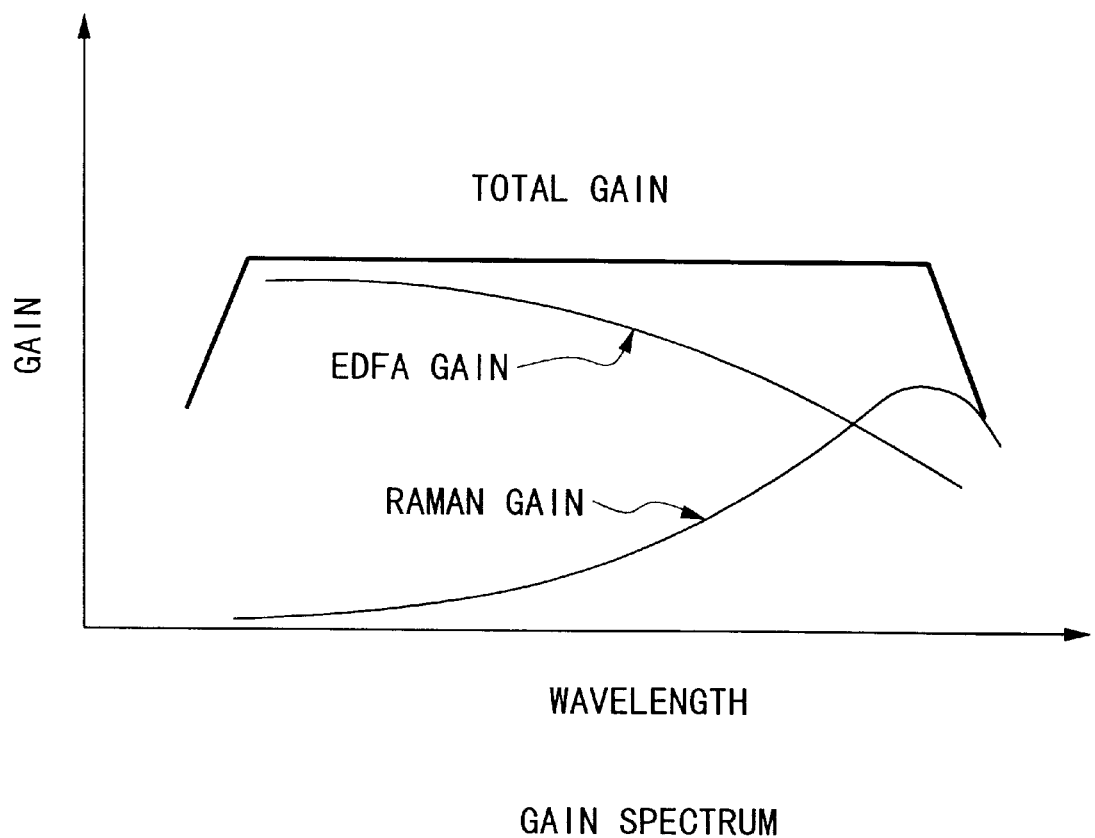
FIG. 28 is a graph showing the characteristics of the gain spectrum of the optical amplifier using Raman amplification.

FIG. 28 is the gain spectrum when a silica fiber transmission path is used as a Raman amplifier. In this case, because a large Raman gain is obtained in the short-wave region of the gain bandwidth, it is possible that the noise characteristics degrades in the Raman amplifier A1. In this embodiment, because the signal beam is Raman amplified by the high nonlinear fiber a1 after being amplified by rare-earth doped fiber a8, it is possible to prevent degradation of the noise characteristics in the short-wave region in the above gain bandwidth.

[Twelfth Embodiment]

Figure 34:
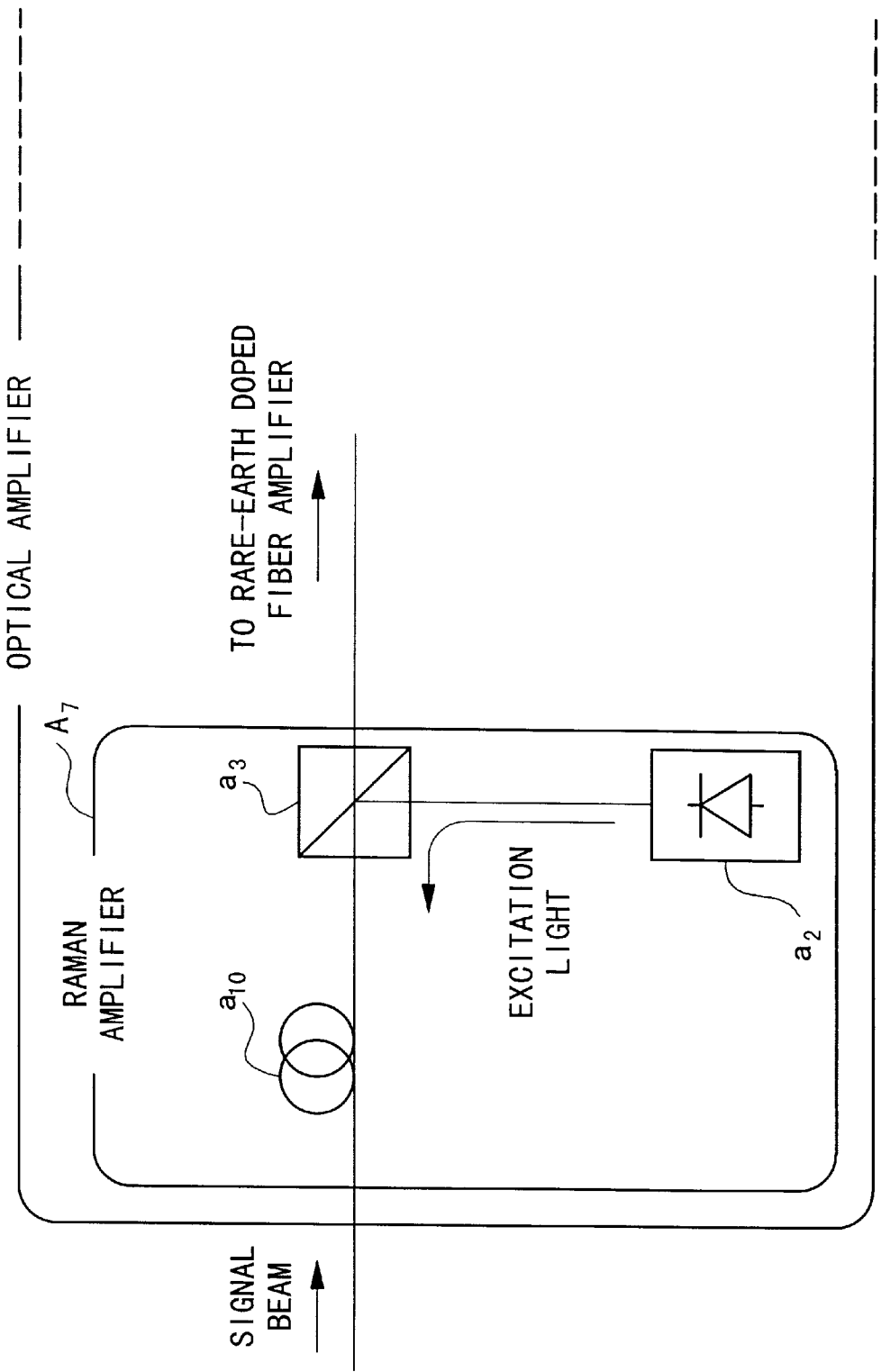
FIG. 34 is a block diagram of a structure of a twelfth embodiment of the optical amplifier in the optical amplifier or an optical transmission system using it according to this invention.

FIG. 34 shows the construction of the twelfth embodiment of the optical amplifier of the present invention.

This embodiment also relates to a variation of the structure of the optical amplifier similar to that in the above tenth and eleventh embodiments. That is, in contrast to the construction of the Raman amplifier A1 shown in the above figure, the Raman amplifier A7 of the present embodiment is characterized is using a dispersion compensation fiber a10 in place of the high nonlinear fiber a1.

Generally, because a dispersion compensation fiber is, like a high nonlinear fiber, etc., characterized in having a small core diameter and a high concentration of dopant, it is possible to use one as a Raman amplifying medium. By using this kind of dispersion compensation fiber, it is possible to compensate transmission path dispersion which accumulates in during signal propagation. In this state, a dispersion compensation of about −200~+200 ps/nm/dB is possible by using a dispersion compensation fiber, it can also sufficiently compensate the accumulated dispersion not only in the transmission system using a dispersion-shifted fiber as a transmission path, but also in a transmission system using a single mode fiber as a transmission path.

Additionally, in the case of a post-amplifier structure, the input optical power to the optical amplifier becomes large, and the multi-wavelength signal beam of the adjacent zero-dispersion wavelength can produce cross-talk between adjacent channels due to the influence of nonlinear effects such as four-wave mixing, but by using the dispersion compensation fiber a10 having a high dispersion such as in the present embodiment, it is possible to suppress this kind of cross-talk.

[Thirteenth Embodiment]

Figure 35:
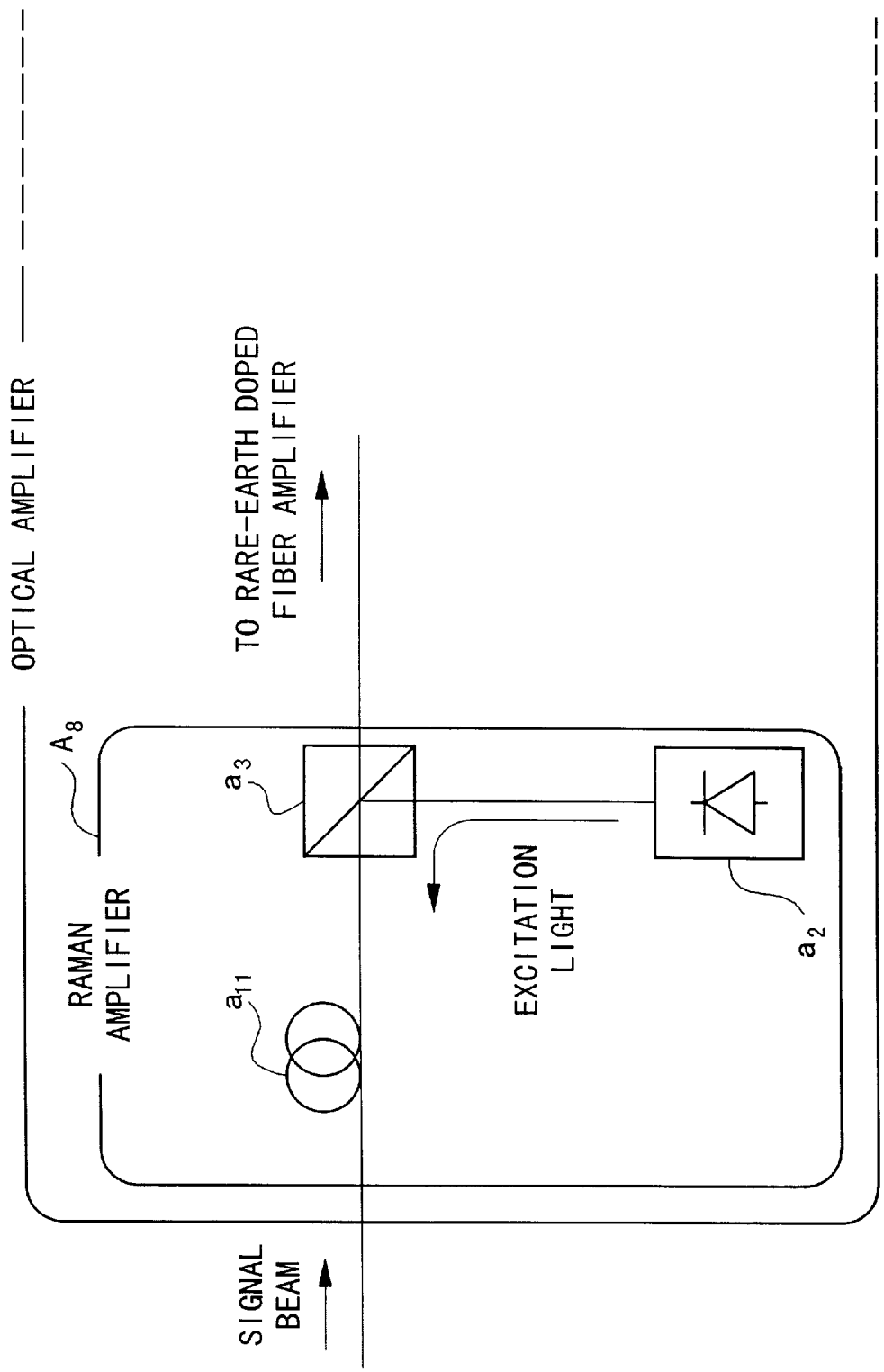
FIG. 35 is a block diagram of a structure of a thirteenth embodiment of the optical amplifier in the optical amplifier or an optical transmission system using it according to this invention.

Next, referring to FIG. 35, the thirteenth embodiment of the optical amplifier according to the present invention will be explained. The present embodiment relates to a variation of the structure of the Raman amplifier in the above-described twelfth embodiment. That is, in place of the above-described dispersion compensation fiber a10, the Raman amplifier A8 of the present embodiment is characterized in applying a dispersion compensation fiber a11 wherein the dispersion slope relates inversely to the dispersion slope of the transmission fiber.

In this manner, by the dispersion slope of the dispersion compensation fiber a11 inversely relating to that of the transmission fiber, it is possible to compensate not only the transmission path dispersion but also high order dispersion (wavelength dependent dispersion; by this, the difference in accumulated dispersion value between signal channels with different wavelengths is occurred).

Next, the embodiments of the transmission systems using the optical amplifier shown in the above-described twelfth and thirteenth embodiments will be explained in referring to the figures. That is, the following embodiment of the optical transmission system is related to an optical amplifier using a dispersion compensation fiber.

[First embodiment of an optical transmission system]

Figure 36A:
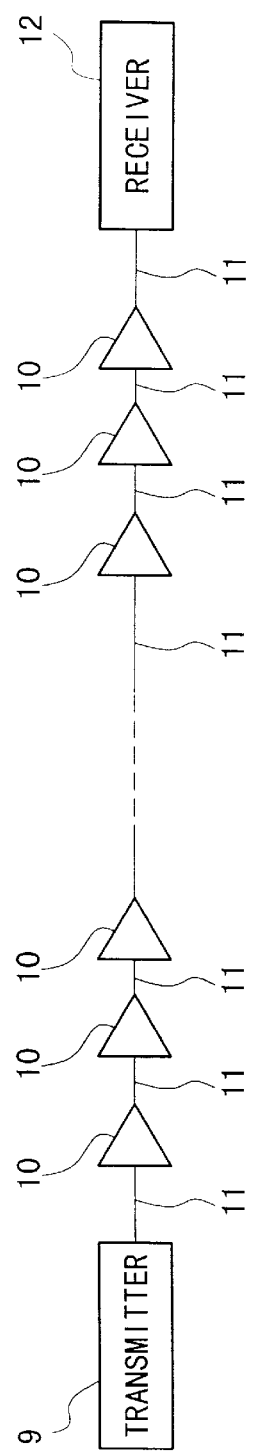
FIGS. 36A and 36B are block diagrams showing the first embodiment of an optical transmission system in the optical amplifier and an optical transmission system using it according to the present invention.

First, referring to FIGS. 36A and 36B, the first embodiment of an optical transmission system will be explained. As shown in FIG. 36A, the optical transmission system of the present embodiment comprises a transmitter 9, a dispersion-shifted fiber 10 having a zero-dispersion wavelength in the 1.5 $\mu$m band, an optical amplifier 11, and a receiver 12.

The optical amplifier 11 is the amplifier of the above twelfth and thirteenth embodiments using a dispersion compensation fibers (a10 or a11) as a Raman amplifying medium. The present optical transmission system is constructed with the transmitter 9 and the receiver 12 connected by the dispersion-shifted fiber 10, and optical amplifiers 11 inserted at each specified repeater interval of the dispersion-shifted fiber 10. Here, each parameter of the dispersion compensation fibers (a10 or a11) are set so as to compensate the dispersion of the transmission path, in the present embodiment, the dispersion-shifted fiber 10.

Figure 36B:
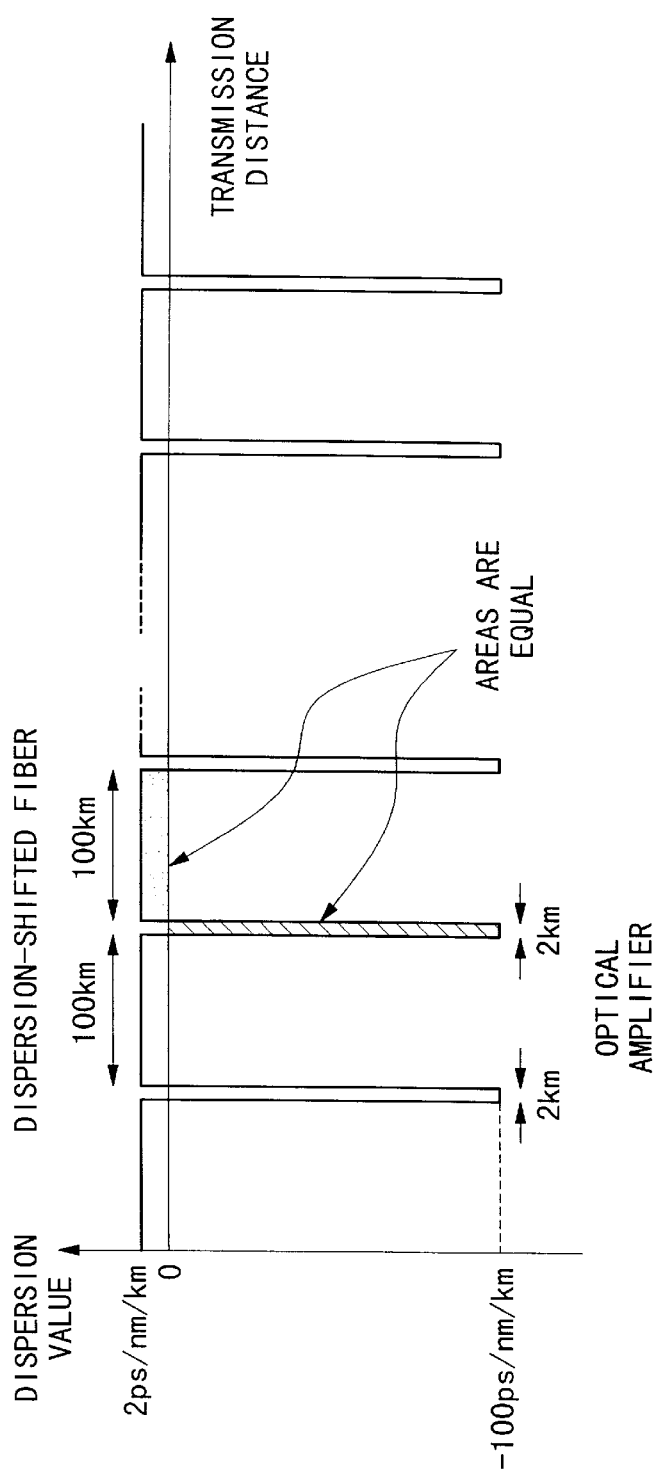

For example, as shown in FIG. 36B, in the case of a dispersion value of the above-described dispersion-shifted fiber 10 of a certain signal beam wavelength being 2 ps/nm/km, and the repeater interval being 100 km, dispersion compensation is possible by setting the dispersion value of the dispersion compensation fibers (a10 or a11) in the optical amplifier 11 and the fiber length to −100 ps/nm/km and 2 km, respectively. That is, as shown in the figure, because the area of the transmission by the dispersion-shifted fiber 10 and the area of the transmission of the dispersion-shifted fibers (a10 and a11) in the optical amplifier 11 are equal, dispersion is compensated.

In addition, as described above, by making the dispersion slope of the dispersion-shifted fiber 10 inverse that of the dispersion compensation fibers (a10 and a11), high order dispersion compensation is possible.

[Second Embodiment of the Optical Transmission System]

Figure 37A:
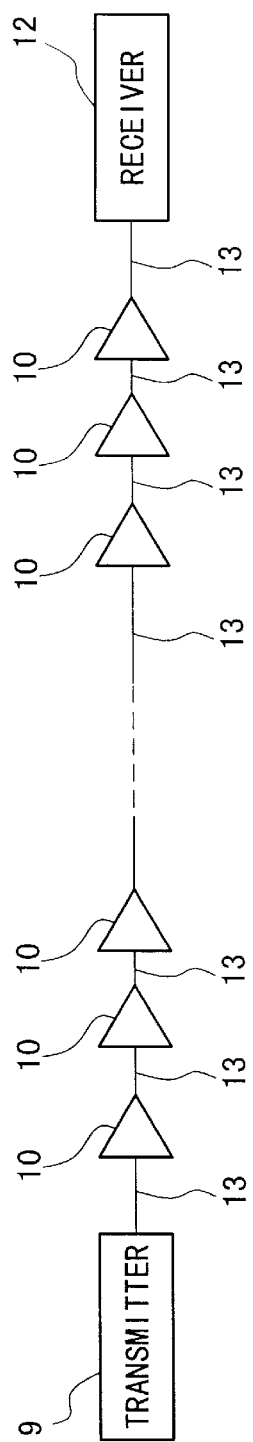
FIGS. 37A and 37B are block diagrams showing the second embodiment of an optical transmission system in the optical amplifier and an optical transmission system using it according to the present invention.

Next, referring to FIGS. 37A and B, the second embodiment of the optical transmission system of the present invention will be explained. This embodiment, as shown in FIG. 37A, is characterized in using a single mode fiber 13 having a zero dispersion wavelength in the 1.3 $\mu$m wavelength band as a transmission path instead of the dispersion-shifted fiber 10 of the above first embodiment. In addition, each parameter of dispersions compensation fibers (a10 and a11) are set so as to compensate the dispersion of the transmission path, that is to say, the single mode fiber 13.

Figure 37B:
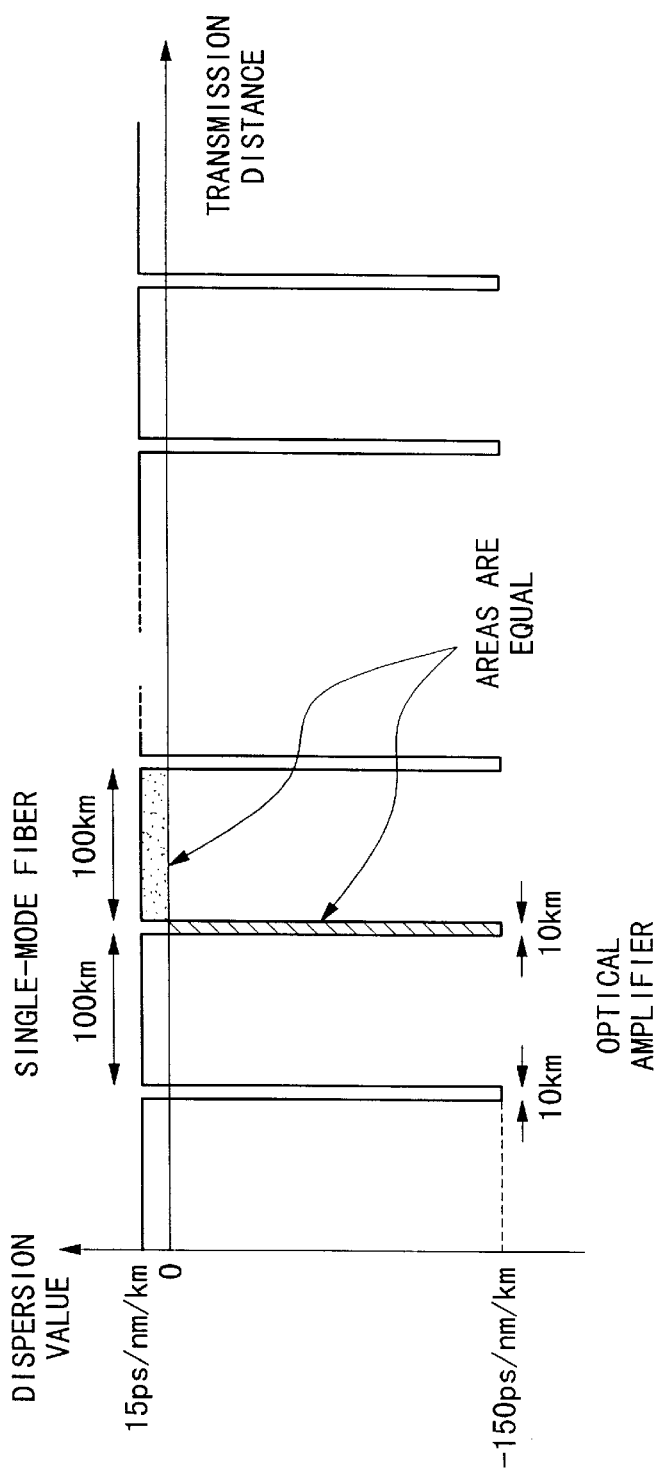

As shown in FIG. 37B, when, for example, the dispersion value of a single mode fiber is at a certain signal beam wavelength is 15 ps/nm/km, and the repeater interval is 100 km, by setting the dispersion value of the dispersion compensation fibers (a10 and a11) in the optical amplifier 11 and the fiber length to 150 pa/nm/km and 10 km respectively as shown in the figure, the dispersion is compensated because the area of the transmission by the single mode fiber 13 and the area of the transmission of the dispersion compensation fibers (a10 and a11) become the identical. In addition, as described above, by making an inverse relationship between the dispersion slope of the single mode fiber 13 and the dispersion slope of the dispersion compensation fibers (a10 and a11) in the optical amplifier 11, high order dispersion compensation is possible.

Moreover, the present invention shown in the seventh through thirteenth embodiments and the two embodiments of the optical transmission system are not limited to the embodiments described above, and the following alterations can be conceived:

(1) In place of the multiplexer a3 of each embodiment, a bi-directional coupler such as an optical circulator can be used. In this case, because it is not necessary to insert an isolator at the input terminal of the rare-earth doped fiber amplifier, it is possible to reduce the loss of the optical signal in the isolator.

(2) Even in the case of using a dispersion compensation fiber as a Raman amplification medium, the excitation light is input at the front and back of the Raman amplifying medium like the above-described ninth embodiment of the optical amplifier.

(3) Even when using a dispersion compensation fiber as a Raman amplifying medium, an isolator can be provided at the input terminal of the optical signal of the dispersion compensation fiber like the above-described tenth embodiment of the optical amplifier.

(4) Even when using a dispersion compensation fiber as a Raman amplifying medium, rare-earth doped fibers can be arranged serially with dispersion compensation fibers like the eleventh embodiment.

(5) In addition to the above, in each embodiment of the above-described optical amplifier using a high nonlinear fiber as a Raman amplifying medium, it is applicable to use a dispersion compensation fiber as a Raman amplifying medium, and it is conceivable to combine each embodiment of the optical amplifier using a dispersion compensation fiber with a means of each above-described embodiment using a high nonlinear fiber. In addition, for an optical amplifier making up by an optical transmission system as well, combining an optical amplifier of each of the above-described embodiments using a dispersion compensation fiber with a means of an optical amplifier of each of the above-described embodiments using a high nonlinear fiber can be conceived.

As explained above, the following effects can be obtained from an optical amplifier according to the above seventh through thirteenth embodiments and an optical transmission system using it:

(1) By combining a Raman amplifier using a Raman amplifying medium and a rare-earth doped fiber amplifier using a rare-earth doped fiber as an amplifying medium, in an optical amplifier carrying out wide bandwidth optical amplification, because a high nonlinear fiber or a dispersion compensation fiber are applied as a Raman amplifying medium, a lumped parameter optical amplifier with a flattened gain bandwidth and a wide bandwidth can be constructed.

(2) In addition, when using a dispersion compensation fiber as a Raman amplifying medium, because it is possible to compensate the dispersion of a transmission path, it is possible to realize large-capacity wavelength division multiplex optical transmission.

As explained above, by the present invention, it is possible to greatly broaden the gain bandwidth of an amplifier. Thus, it is possible to increase the number of signal beam channels and the transmission capacity, and it is possible to realize the high degree and economic wavelength division multiplexing system.

In addition, the present invention can be widely used not only in a ground-based trunk transmission system but also in a subscriber system, the optical transmission of wavelength division multiplexing of submarine repeater transmission path system, and so on.

What is claimed is:

1. An optical amplifier, comprising:

N amplifiers including a gain medium using a rare-earth doped fiber as a long length gain medium, which are divided into N stages, N being an integer equal to or greater than 2, and an excitation light source which outputs excitation light whose effective excitation wavelength of said gain medium is 1.53 μm; and (N−1) gain equalizers which are installed between said N amplifiers respectively, and are effective over the wide wavelength band of said gain medium.

2. An optical amplifier according to claim 1, wherein said excitation light comprises a plurality of excitation lights of different excitation wavelengths.

3. An optical amplifier according to claim 1, wherein said rare-earth doped fiber is an erbium doped fiber.

4. An optical amplifier according to claim 1, further comprising:

an excitation light source which sends Raman amplifying excitation light to a silica fiber transmission path connecting said optical amplifiers.

5. An optical amplifier according to claim 4, wherein said optical amplifier further comprises a directional coupler on the input side, and said Raman amplifying excitation light is sent to a Raman amplifying medium via said directional coupler.

6. An optical amplifier according to claim 5, wherein said Raman amplifying excitation light has a wavelength which makes the amplification band of said optical amplifier wide.

7. An optical amplifier according to claim 6, wherein:

said rare-earth doped fiber is an erbium doped fiber; and the wavelength of the Raman amplification excitation light is in the range of 1.49 to 1.53 μm.

8. An optical amplifier according to claim 2, wherein said amplifier is provided with a ring construction in which a second desired excitation light differing from a first excitation optical wavelength from said excitation optical source oscillates in the same direction as the signal beam.

9. An optical amplifier according to claim 8, wherein said ring construction includes a WDM coupler which multiplexes and demultiplexes the second excitation light in a signal beam and a light amplified by said gain medium.

10. An optical amplifier according to claim 2, wherein said amplifier is provided with a ring construction wherein a desired second excitation light which is different from a first excitation light wavelength by said excitation light source oscillates in the opposite direction of the signal beam.

11. An optical amplifier according to claim 10, wherein said ring structure includes a directional coupler which multiplexes said second excitation light in a signal beam and a light by amplified by said gain medium.

12. An optical amplifier according to claim 10, wherein said ring construction further comprises:

a second excitation light source which generates an excitation light which is the same frequency of said first excitation light; and a multiplexer which optically multiplexes excitation light from said second excitation light source in said ring construction.

13. An optical amplifier comprising:

a Raman amplifier which is provided with an internal Raman amplifier medium and carries out Raman amplification by said Raman amplification medium; and a rare-earth doped fiber amplifier in which a rare-earth doped fiber is used as an amplification medium;

wherein said Raman amplifier medium is a high nonlinear fiber,
wherein said Raman amplifier comprises:
a high nonlinear fiber into one terminal of which an optical signal is input via a transmission fiber;
an excitation light source which generates an excitation light; and
a multiplexer which is connected to the other terminal of said high nonlinear fiber, and which makes the excitation light input into said high nonlinear fiber, and outputs an optical signal input from said high nonlinear fiber into said rare-earth doped fiber amplifier.

14. An optical amplifier comprising:
a Raman amplifier which is provided with an internal Raman amplifier medium and carries out Raman amplification by said Raman amplification medium; and
a rare-earth doped fiber amplifier in which a rare-earth doped fiber is used as an amplification medium;
wherein said Raman amplifying medium is a dispersion compensation fiber;
wherein said Raman amplifier comprises:
a dispersion compensation fiber into one terminal of which an optical signal is input via a transmission fiber;
an excitation light source which generates an excitation light; and
a multiplexer which is connected to the other terminal of said dispersion compensation fiber, and which makes the excitation light input into said dispersion compensation fiber, and outputs an optical signal input from said high nonlinear fiber into said rare-earth doped fiber amplifier.

15. An optical amplifier according to claim 13, wherein said Raman amplifier further comprises:
a second excitation light source which generates excitation light; and
a second multiplexer which makes the excitation light input into said one terminal of the Raman amplifying medium.

16. An optical amplifier according to claim 15, wherein said Raman amplifier comprises:
a rare-earth doped fiber inserted between said second multiplexer and said Raman amplifying medium.

17. An optical amplifier according to claim 13, wherein said Raman amplifier further comprises:
an isolator which is installed at the terminal of said Raman amplifying medium and prevents leakage of the excitation light into the transmission fiber.

18. An optical amplifier comprising:
a Raman amplifier which is provided with an internal Raman amplifier medium and carries out Raman amplification by said Raman amplification medium; and
a rare-earth doped fiber amplifier in which a rare-earth doped fiber is used as an amplification medium;
wherein said rare-earth doped amplifier comprises:
a pre-stage amplifier which uses a rare-earth doped fiber as an amplifying medium;
a post-stage amplifier which similarly uses a rare-earth doped fiber as an amplifying medium; and
a gain equalizing means inserted between said poste-stage amplifier and said pre-stage amplifier.

19. An optical amplifier according to claim 13, wherein the dispersion slope of said dispersion compensation fiber has a reverse relationship with the dispersion slope of the transmission fiber.

20. An optical amplifier according to claim 13, wherein said Raman amplifier uses a directional coupler instead of said multiplexer.

21. An optical amplifier comprising:
a transmitter which transmits an optical signal;
a transmission path using a dispersion-shifted fiber;
a receiver which receives an optical signal; and
an optical fiber, comprising a Raman amplifier which carries out Raman amplification by a dispersion compensation fiber whose parameters are set to compensate the dispersion of said transmission path, and a rare-earth doped fiber amplifier which uses a rare-earth doped fiber as an amplifier medium;
wherein said Raman amplifier comprises:
a dispersion compensation fiber into one terminal of which an optical signal is input via a transmission fiber;
an excitation light source which generates an excitation light; and
a multiplexer which is connected to the other end of said dispersion compensation fiber, and which makes the excitation light input into said dispersion compensation fiber, and outputs an optical signal input from said dispersion compensation fiber into said rare-earth doped fiber amplifier.

22. An optical amplifier according to claim 21, wherein said Raman amplifier further comprises:
a second excitation light source which generates excitation light;
a second multiplexer which makes the excitation light input into said one terminal of the Raman amplifying medium.

23. An optical amplifier according to claim 22, wherein said Raman amplifier further comprises:
a rare-earth doped fiber inserted between said second multiplexer and said Raman amplifying medium.

24. An optical amplifier according to claim 21, wherein said Raman amplifier further comprises:
an isolator which is installed at the terminal of said Raman amplifying medium, and prevents leakage of the excitation light into the transmission fiber.

25. An optical fiber amplifier comprising:
a transmitter which transmits an optical signal;
a transmission path using a dispersion-shifted fiber;
a receiver which receives an optical signal; and
an optical fiber, comprising a Raman amplifier which carries out Raman amplification by a dispersion compensation fiber whose parameters are set to compensate the dispersion of said transmission path, and a rare-earth doped fiber amplifier which uses a rare-earth doped fiber as an amplifier medium;
wherein said rare-earth doped fiber amplifier comprises:
a pre-stage amplifier which uses a rare-earth doped fiber as an amplifying medium;
a post-stage amplifier which similarly uses a rare-earth doped fiber as an amplifying medium; and
a gain equalizing means inserted between the post-stage amplifier and the pre-stage amplifier.

26. An optical fiber according to claim 21, wherein said Raman amplifier uses a directional coupler instead of said multiplexer.

27. An optical amplifier comprising:
a transmitter which transmits an optical signal;
a transmission path using a single mode fiber; and an optical amplifier, comprising a Raman amplifier which carries out Raman amplification by a dispersion compensation fiber whose parameters are set to compensate the dispersion of said transmission path, and a rare-earth doped fiber amplifier which uses a rare-earth doped fiber as an amplifier medium;

wherein said Raman amplifier comprises:

a dispersion compensation fiber into one terminal of which an optical signal is input via a transmission fiber;

an excitation light source which generates excitation light; and a multiplexer which is connected to the other terminal of said dispersion compensation fiber, and which makes the excitation signal input into said dispersion compensation fiber, and output an optical signal input from said dispersion compensation fiber into said rare-earth doped fiber amplifier.

28. An optical amplifier according to claim 27, wherein said Raman amplifier further comprises:

a second excitation light source which generates excitation light; and a second multiplexer which makes the excitation light input into said one terminal to a Raman amplifying medium.

29. An optical amplifier according to claim 28, wherein said Raman amplifier further comprises:

a rare-earth doped fiber inserted between said second multiples and said Raman amplifying medium.

30. An optical amplifier according to claim 27, wherein said Raman amplifier further comprises:

an isolator which is installed at the terminal of said Raman amplifying medium and prevents leakage of the excitation light into the transmission fiber.

31. An optical amplifier comprising:

a transmitter which transmits an optical signal;

a transmission path using a single mode fiber; and an optical amplifier, comprising a Raman amplifier which carries out Raman amplification by a dispersion compensation fiber whose parameters are set to compensate the dispersion of said transmission path and a rare-earth doped fiber amplifier which uses a rare-earth doped fiber as an amplifier medium;

wherein said rare-earth doped fiber amplifier comprises:

a pre-stage amplifier which uses a rare-earth doped fiber as an amplifying medium;

a post-stage amplifier which similarly uses a rare-earth doped fiber as an amplifying medium; and a gain equalizing means inserted between the poste stage amplifier and the pre-stage amplifier.

32. An optical amplifier according to claim 27, wherein said Raman amplifier uses a directional coupler instead of said multiplexer.

* * * * *